US011964492B2

(12) United States Patent
Tokisawa et al.

(10) Patent No.: US 11,964,492 B2
(45) Date of Patent: Apr. 23, 2024

(54) STIRRING ELEMENT, STIRRING DEVICE, AND RECORDING APPARATUS

(71) Applicant: CANON KABUSHIKI KAISHA, Tokyo (JP)

(72) Inventors: Toshiaki Tokisawa, Kanagawa (JP); Takashi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 17/508,827

(22) Filed: Oct. 22, 2021

(65) Prior Publication Data

US 2022/0134764 A1 May 5, 2022

(30) Foreign Application Priority Data

Oct. 29, 2020 (JP) ................................ 2020-181044

(51) Int. Cl.
*B41J 2/175* (2006.01)

(52) U.S. Cl.
CPC ................................ *B41J 2/17503* (2013.01)

(58) Field of Classification Search
CPC .. B41J 2/1404; B41J 2/17503; B41J 2/17513; B41J 2202/12; B41J 2/175; B41J 2/18; B41J 29/02; B41J 29/38; B01F 23/53; B01F 25/50; G03G 15/0889
See application file for complete search history.

(56) References Cited

U.S. PATENT DOCUMENTS

2017/0348977 A1* 12/2017 Arima ........................ B41J 2/09
2018/0086083 A1* 3/2018 Marra, III ................ B41J 2/175

FOREIGN PATENT DOCUMENTS

JP 2003311139 A * 11/2003
JP 2007136443 A 6/2007

* cited by examiner

*Primary Examiner* — Jannelle M Lebron
(74) *Attorney, Agent, or Firm* — Canon U.S.A., Inc. I.P. Division

(57) ABSTRACT

A stirring element to stir liquid includes a rod-shaped body configured to have a magnetic force at a first end portion and to have a magnet force at a second end portion opposite to the first end portion in a longitudinal direction, a first blade configured to extend on the first end portion of the rod-shaped body, and a second blade configured to extend on the second end portion of the rod-shaped body. The first blade and the second blade each have a plate shape.

18 Claims, 18 Drawing Sheets

STIRRING ELEMENT, STIRRING DEVICE, AND RECORDING APPARATUS

BACKGROUND

Field of the Disclosure

The present disclosure relates to stirring elements for stirring liquid, stirring devices, and recording apparatuses.

Description of the Related Art

There is known a conventional stirring device of which the magnetic stirrer rotates a stirring element in a rod-shape provided with a magnet on either end in a liquid container to stir liquid in it. Japanese Patent Application Laid-Open No. 2007-136443 discusses a stirring element provided with a supporting body in a rod shape extending along the rotation axis and stirring blades attached to the supporting body.

However, the configuration discussed in Japanese Patent Application Laid-Open No. 2007-136443 is complex with the supporting body provided with the stirring blades. There is a demand for a stirring element, a stirring device, or a recording apparatus provided with the stirring device with a simple configuration and high stirring efficiency.

SUMMARY

The present disclosure is directed to the provision of a stirring element, a stirring device, or a recording apparatus provided with the stirring device with a simple configuration and high stirring efficiency.

According to an aspect of the present disclosure, a stirring element to stir liquid includes a rod-shaped body configured to have a magnetic force at a first end portion and to have a magnet force at a second end portion opposite to the first end portion in a longitudinal direction, a first blade configured to extend on the first end portion of the rod-shaped body, and a second blade configured to extend on the second end portion of the rod-shaped body. The first blade and the second blade each have a plate shape.

Further features of the present disclosure will become apparent from the following description of exemplary embodiments with reference to the attached drawings.

DESCRIPTION OF THE EMBODIMENTS

Some exemplary embodiments of the present disclosure will be described in detail below with reference to the attached drawings. The exemplary embodiments described below do not limit the present disclosure according to the claims. Not all of the combinations of features described in the exemplary embodiments are used to the solution in the present disclosure. Like numbers refer to like elements throughout the drawings. Relative arrangements, shapes, and the like described in the exemplary embodiments are mere examples, and do not limit the scope of the present disclosure.

In the following descriptions of the exemplary embodiments, "recording" refers to forming significant information such as characters and figures and forming an image and a pattern on a sheet in a broad sense. In addition, it is assumed that roll sheets are used as a sheet in the present exemplary embodiments, but cut sheets, cloth, plastic films, and the like may be used.

<Inkjet Recording Apparatus>

Figure 1:
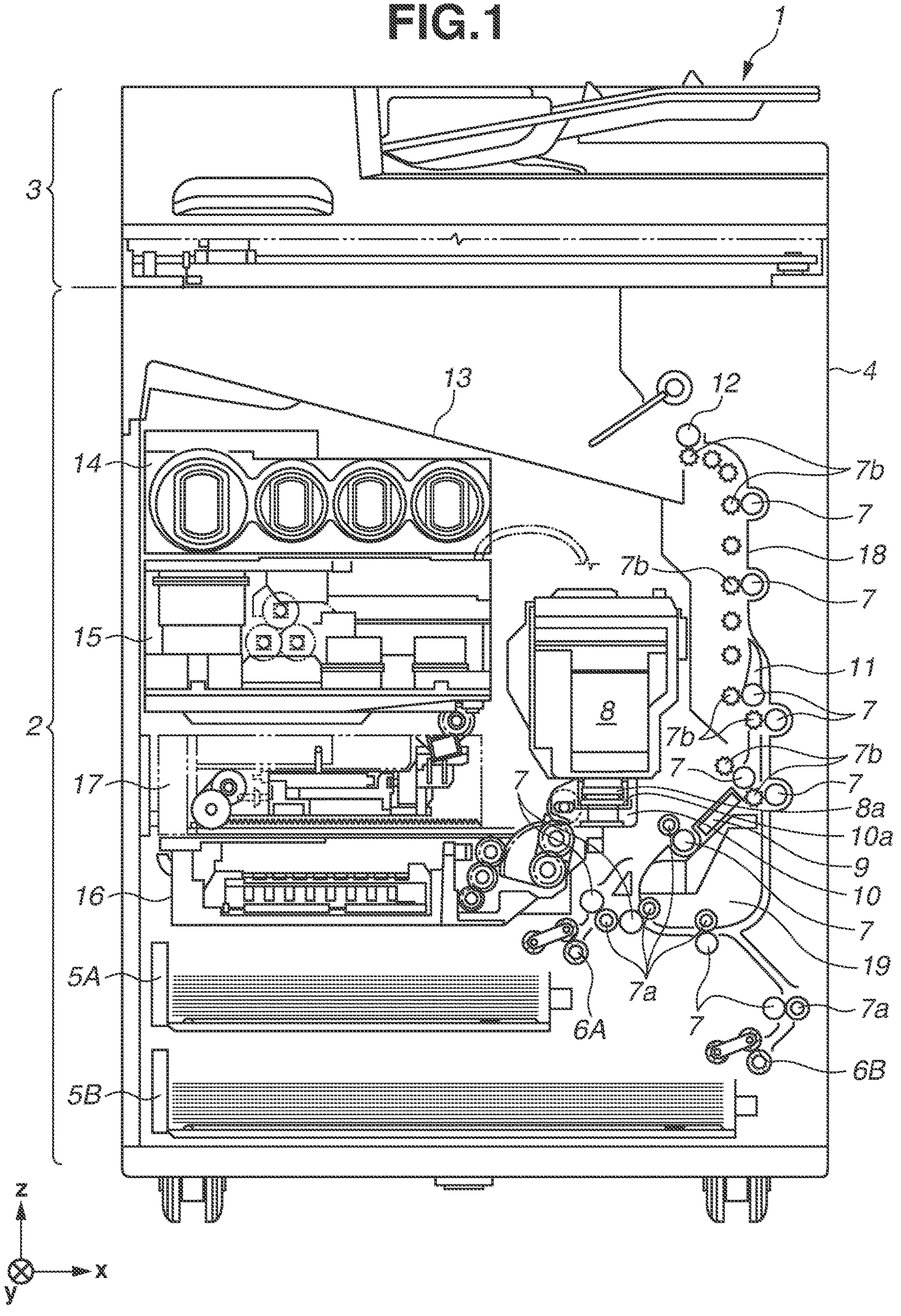
FIG. 1 illustrates a recording apparatus in a standby state.

FIG. 1 is an internal configuration diagram of an inkjet recording apparatus 1 (hereinafter, a recording apparatus 1) used in the present exemplary embodiment. In the drawings, an x direction is a horizontal direction, a y direction (the direction perpendicular to a sheet surface) is a direction in which discharge ports are arranged in a recording head 8, and a z direction is a vertical direction.

The recording apparatus 1 is a multifunction peripheral equipped with a print unit 2 and a scanner unit 3. The print unit 2 and the scanner unit 3, separately or in cooperation with each other, can perform various kinds of processing related to recording operation and reading operation. The scanner unit 3 includes an automatic document feeder (ADF) and a flatbed scanner (FBS), and can read a document automatically fed by the ADF and read (scan) a document placed on the platen of the FBS by a user. According to the present exemplary embodiment, the multifunction peripheral includes both the print unit 2 and the scanner unit 3, but it may not include the scanner unit 3. FIG. 1 illustrates the recording apparatus 1 in a standby state of no recording operation or reading operation.

In the print unit 2, a first cassette 5A and a second cassette 5B for storing recording media (cut sheets) S are detachably installed at the bottom of a housing 4 in the vertical direction.

The first cassette 5A stores recording media relatively smaller down to an A4 size, and the second cassette 5B stores recording medium relatively larger up to an A3 size, in a flat stack. A first feeding unit 6A for separating and feeding the stored recording media one by one is provided near the first cassette 5A. Similarly, a second feeding unit 6B is provided near the second cassette 5B. Recording media is fed from either the first cassette 5A or the second cassette 5B selectively in recording operation.

Conveyance rollers 7, a discharge roller 12, pinch rollers 7*a*, spurs 7*b*, a guide 18, an inner guide 19, and a flapper 11 constitute a conveyance mechanism for guiding the recording media S in a predetermined direction. The conveyance rollers 7 are drive rollers arranged upstream and downstream of the recording head 8 and are driven by a not-illustrated conveyance motor. The pinch rollers 7*a* are driven rollers to rotate nipping a recording medium S with the conveyance roller 7. The discharge roller 12 is a drive roller arranged downstream of the conveyance rollers 7 and is driven by the not-illustrated conveyance motor. The spurs 7*b* pinch and convey a recording medium S together with the conveyance roller 7 and the discharge roller 12 arranged downstream of the recording head 8.

The guide 18 is arranged along the conveyance path of the recording media S and guides the recording media S in the predetermined direction. The inner guide 19 is a member extending in the y direction, and has a curved side surface and guides the recording media S along the curved side surface. The flapper 11 is a member for switching the direction in which the recording medium S is conveyed in a duplex recording operation. A discharge tray 13 is a tray for stacking and storing the recording media S discharged by the discharge roller 12 after the recording operation is completed.

The recording head 8 according to the present exemplary embodiment is a full line type of color inkjet recording head in which a plurality of discharge ports for discharging ink based on recording data is arrayed in the y direction in FIG. 1 across a width corresponding to the width of the recording media S. The recording head 8 is configured to discharge a plurality of color inks. With the recording head 8 at a standby position, a discharge port surface 8*a* of the recording head 8 faces vertically downward as illustrated in FIG. 1 and is capped with a cap unit 10. In recording operation, a print controller 202 described below turns the recording head 8 for the discharge port surface 8*a* to face a platen 9. The platen 9 is a flat plate extending in the y direction and supports the recording media S from the back surface under recording operation by the recording head 8. The movement of the recording head 8 from the standby position to a recording position will be described in detail below.

Ink tank units 14 contain four color inks to be supplied to the recording head 8. An ink supply unit 15 is provided in the middle of the flow path connecting the ink tank units 14 and the recording head 8 and adjusts pressures and flow rates of the inks in the recording head 8 in appropriate ranges. According to the present exemplary embodiment, a circulating ink supply system is used, and the ink supply unit 15 adjusts the pressures of the inks to be supplied to the recording head 8 and the flow rates of the inks to be collected from the recording head 8 in appropriate ranges.

A maintenance unit 16 includes the cap unit 10 and a wiping unit 17 and operate these units at predetermined timings to perform maintenance operation on the recording head 8.

Figure 2:
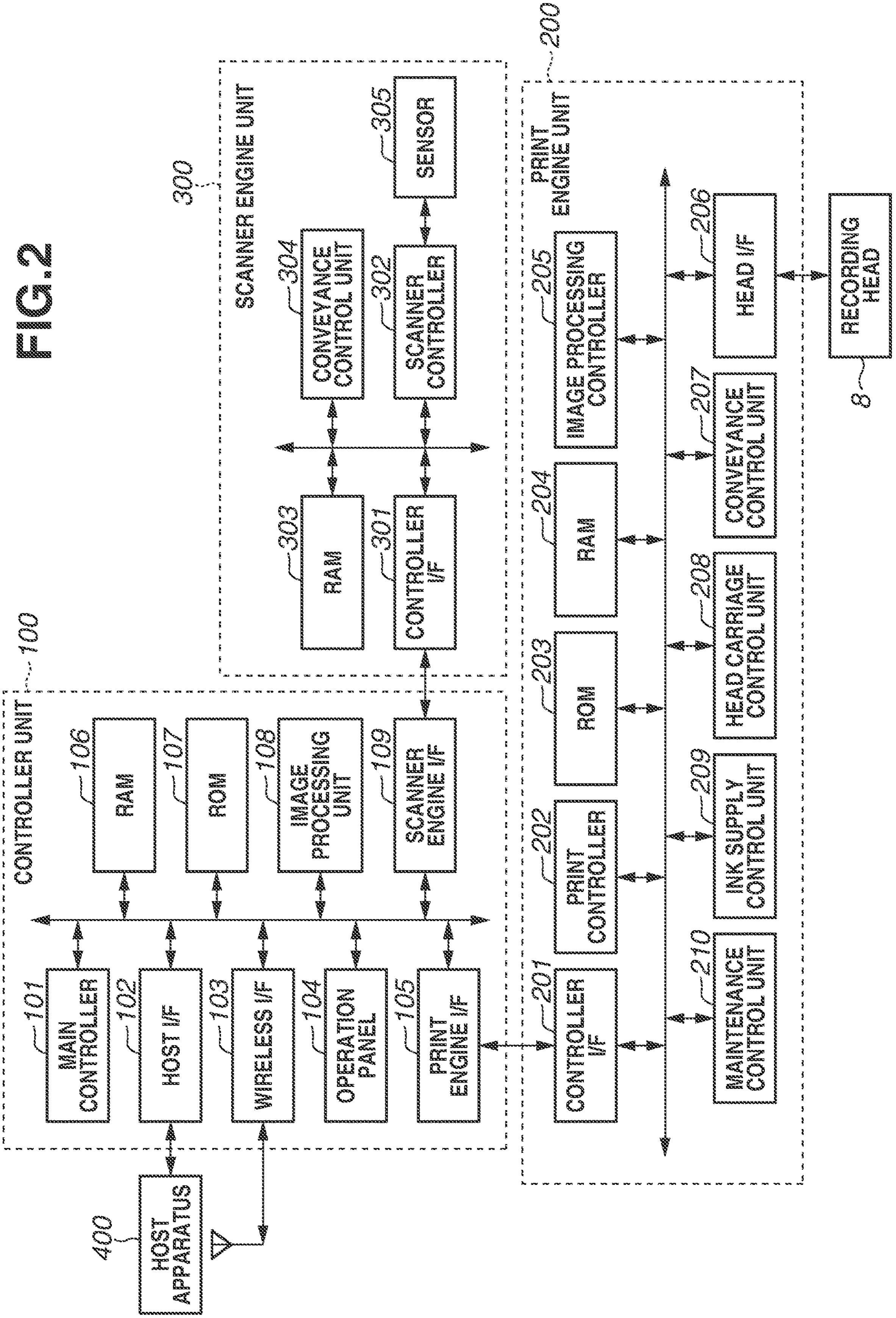
FIG. 2 is a control configuration diagram of the recording apparatus.

FIG. 2 is a block diagram illustrating a control configuration in the recording apparatus 1. The control configuration mainly includes a print engine unit 200 to control the print unit 2, a scanner engine unit 300 to control the scanner unit 3, and a controller unit 100 to generally control the recording apparatus 1. The print controller 202 controls various kinds of mechanism in the print engine unit 200 following disclosure from a main controller 101 in the controller unit 100. The main controller 101 in the controller unit 100 controls various kinds of mechanism in the scanner engine unit 300. The control configuration will be described in detail.

In the controller unit 100, the main controller 101 configured with a central processing unit (CPU) generally controls the recording apparatus 1 based on programs and various parameters stored in a read-only memory (ROM) 107 using a random access memory (RAM) 106 as a work area. For example, in response to an input of a print job on the host apparatus 400 via a host interface (I/F) 102 or a wireless I/F 103, an image processing unit 108 performs predetermined image processing on the received image data based on disclosure from the main controller 101. Subsequently, the main controller 101 transmits the image data that has undergone the image processing to the print engine unit 200 via a print engine I/F 105.

The recording apparatus 1 may acquire image data from a host apparatus 400 via wireless communication or wired communication or from an external storage device (a Universal Serial Bus (USB) memory and the like) connected to the recording apparatus 1. The communication scheme used for wireless communication or wired communication is not limited. For example, Wireless Fidelity (Wi-Fi®) and Bluetooth® can be applied to wireless communication. A USB can be applied to wired communication. Further, for example, in response to an input of a reading command from the host apparatus 400, the main controller 101 transmits the reading command to the scanner unit 3 via a scanner engine I/F 109.

An operation panel 104 is a mechanism for users to perform input to and output from the recording apparatus 1. The operation panel 104 includes a touch panel for receiving operation by a user and a touch panel display including a display for displaying information. The operation panel 104 may further include operation buttons. Users can instruct copy and scanning operations, set a print mode, and recognize information about the recording apparatus 1 via the operation panel 104.

In the print engine unit 200, the print controller 202 configured with a CPU controls various kinds of mechanism included in the print unit 2 based on programs and various kinds of parameters stored in a ROM 203 using a RAM 204 as a work area. If various kinds of commands and image data are received via a controller I/F 201, the print controller 202 temporarily stores the commands and image data in the RAM 204. The print controller 202 causes an image processing controller 205 to convert the stored image data into recording data so that the recording head 8 can use the recording data in the recording operation. In response to the generation of the recording data, the print controller 202 causes the recording head 8 to perform recording operation based on the recording data via a head I/F 206. At that time, the print controller 202 drives the feeding units 6A and 6B, the conveyance rollers 7, the discharge roller 12, and the flapper 11 in FIG. 1 via a conveyance control unit 207 to convey a recording medium S. The recording head 8 performs the recording operation and print processing in sync with the conveyance operation of the recording medium S following disclosure from the print controller 202.

A head carriage control unit 208 changes the orientation and the position of the recording head 8 according to the operation state of the recording apparatus 1 such as a maintenance state and a recording state. An ink supply control unit 209 controls the ink supply unit 15 so that the pressures of the inks to be supplied to the recording head 8 fall within appropriate ranges. A maintenance control unit 210 controls operations of the cap unit 10 and the wiping unit 17 in the maintenance unit 16 in a maintenance operation on the recording head 8.

In the scanner engine unit 300, the main controller 101 controls a hardware resource in a scanner controller 302 based on programs and various kinds of parameters stored in the ROM 107 using the RAM 106 as a work area. This configuration allows the mechanisms included in the scanner unit 3 to be controlled. For example, the main controller 101 controls the hardware resource in the scanner controller 302 via a controller I/F 301 to convey a document placed on the ADF by a user via a conveyance control unit 304 and cause a sensor 305 to read it. Then, the scanner controller 302 stores the read image data in a RAM 303. The print controller 202 converts the image data acquired as described above into recording data, allowing the recording head 8 to perform recording operation based on the image data read by the scanner controller 302.

Figure 3:
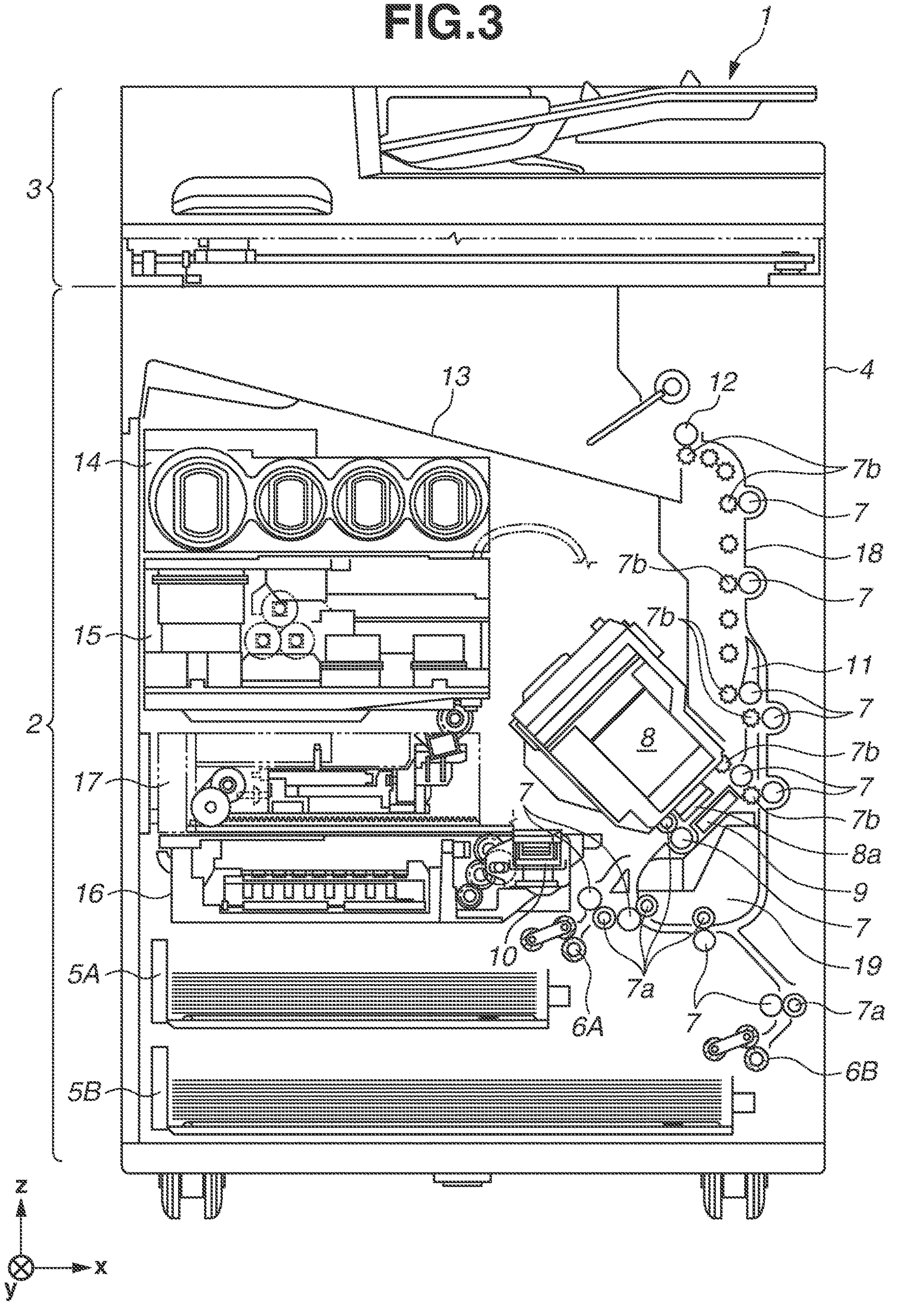
FIG. 3 illustrates the recording apparatus in a recording state.

FIG. 3 illustrates the recording apparatus 1 in a recording state. Compared with the standby state illustrated in FIG. 1, the cap unit 10 is separated from the discharge port surface 8*a* of the recording head 8, with the discharge port surface 8*a* facing the platen 9. According to the present exemplary embodiment, the flat surface of the platen 9 is tilted at approximately 45 degrees to the horizontal direction; the discharge port surface 8*a* at the recording position is also tilted at approximately 45 degrees to the horizontal direction with a fixed clearance kept away from the platen 9.

In movement of the recording head 8 from the standby position of FIG. 1 to the recording position of FIG. 3, the print controller 202 instructs the maintenance control unit 210 to lower the cap unit 10 down to a retracted position illustrated in FIG. 3. This separates the discharge port surface 8*a* of the recording head 8 from a cap member 10*a*. Then, the print controller 202 instructs the head carriage control unit 208 to rotate the recording head 8 by 45 degrees while adjusting the height of the recording head 8 in the vertical direction to point the discharge port surface 8*a* to the platen 9. In movement of the recording head 8 from the recording position to the standby position after the completion of the recording operation, the print controller 202 performs the above-described processes in reverse order.

Figure 4:
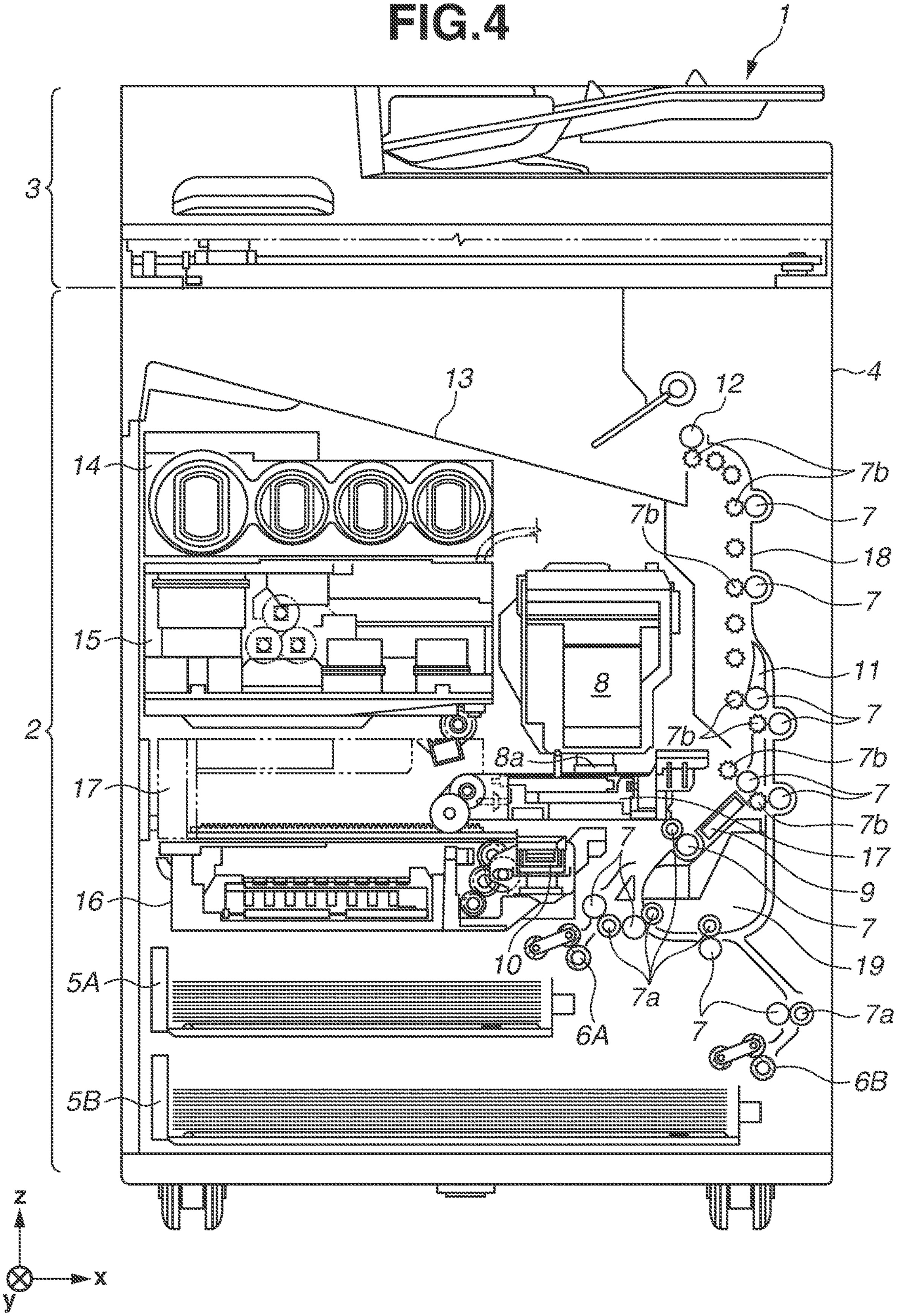
FIG. 4 illustrates the recording apparatus in a maintenance state.

FIG. 4 illustrates the recording apparatus 1 in a maintenance state. In movement of the recording head 8 from the standby position illustrated in FIG. 1 to the maintenance position illustrated in FIG. 4, the print controller 202 moves the recording head 8 upward in the vertical direction and also moves the cap unit 10 downward in the vertical direction. Further, the print controller 202 moves the wiping unit 17 from the retracted position in the right direction in FIG. 4. Then, the print controller 202 moves the recording head 8 in the vertically downward direction to the maintenance position that allows maintenance operation.

On the other hand, in movement of the recording head 8 from the recording position illustrated in FIG. 3 to the maintenance position illustrated in FIG. 4, the print controller 202 moves the recording head 8 in the vertically upward direction while rotating the recording head 8 by 45 degrees. Further, the print controller 202 moves the wiping unit 17 in the right direction from the retracted position. Then, the print controller 202 moves the recording head 8 in the vertically downward direction to the maintenance position that allows maintenance operation.

<Ink Supply Unit (Circulation System)>

Figure 5:
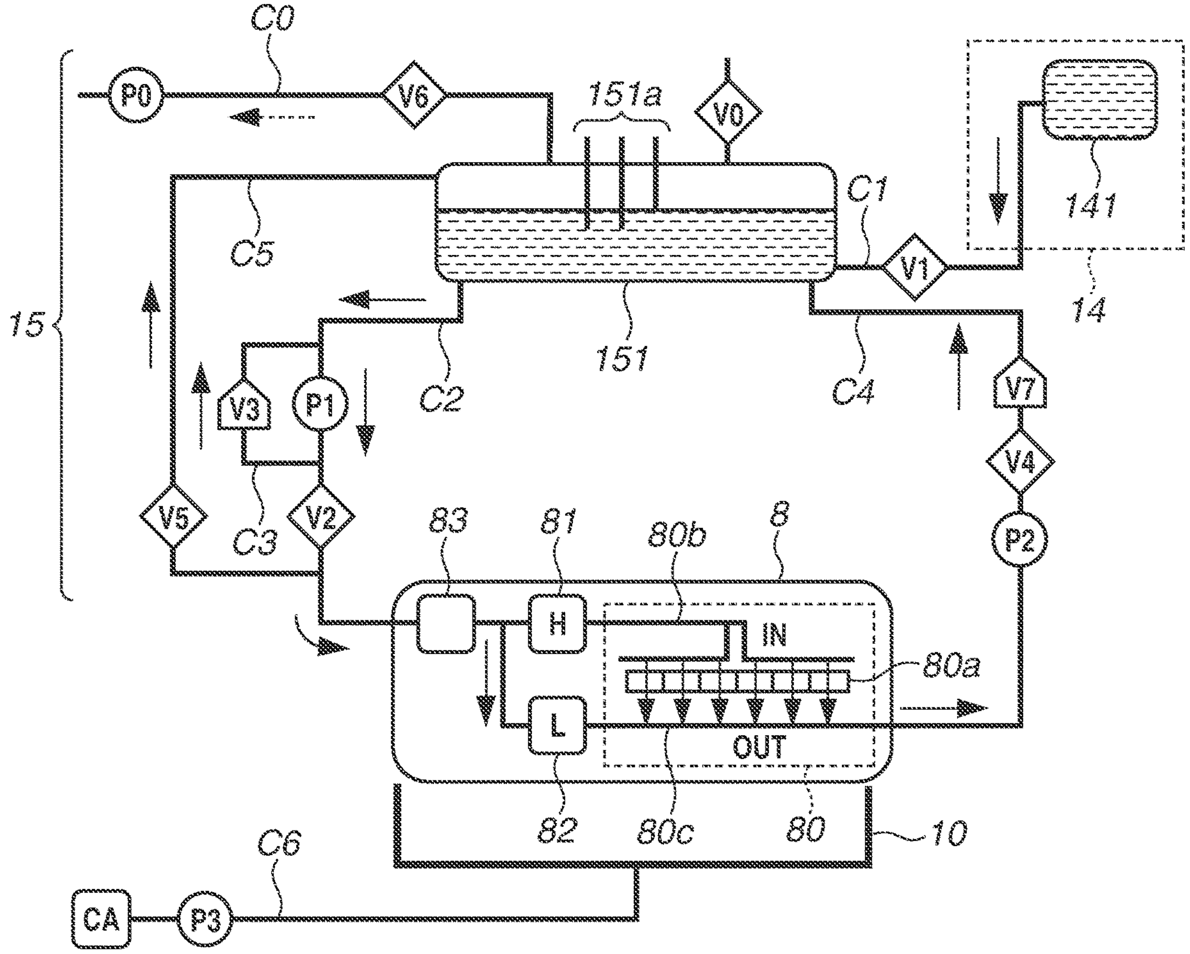
FIG. 5 illustrates a configuration of flow paths of in an ink circulation system.

FIG. 5 illustrates the ink supply unit 15 used in the inkjet recording apparatus 1 according to the present exemplary embodiment. A flow path configuration of an ink circulation system according to the present exemplary embodiment will be described with reference to FIG. 5. The ink supply unit 15 supplies the ink supplied from the ink tank unit 14 to the recording head 8 (a head unit). FIG. 5 illustrates a configuration for the ink of one color, but the configuration is actually prepared for each ink color. The ink supply unit 15 is basically controlled by the ink supply control unit 209 illustrated in FIG. 2. Each configuration in the ink supply unit 15 will be described below.

The ink circulates mainly between a sub tank 151 as a liquid container and the recording head 8. The recording head 8 performs ink discharge operation based on image data, and the ink that has not been discharged is collected again in the sub tank 151.

The sub tank 151 that contains a predetermined amount of ink is connected to a supply flow path C2 for supplying the ink to the recording head 8 and a collection flow path C4 for collection the ink from the recording head 8. In other words, the sub tank 151, the supply flow path C2, the recording head 8, and the collection flow path C4 form a circulation flow path (a circulation path) through which the ink circulates. The sub tank 151 is also connected to a flow path C0 through which air flows. A sub tank pressure reducing valve V6 is arranged on the flow path C0 to the sub tank 151.

The sub tank 151 is provided with a liquid level detection unit 151*a* including a plurality of electrode pins. The ink supply control unit 209 can determine the height of an ink level, namely an amount of ink remaining in the sub tank 151 by detecting whether a conduction current among the plurality of electrode pins runs. A decompression pump P0 (an in-tank decompression pump) is a negative pressure generation source for decompressing the inside of the sub tank 151. An atmosphere relief valve V0 is a valve for switching whether to communicate the inside of the sub tank 151 with the atmosphere.

A main tank 141 contains the ink to be supplied to the sub tank 151. The main tank 141 is made of a flexible member, and the ink is supplied to the sub tank 151 according to the volume of the flexible member. The main tank 141 is attachable to/detachable from the main body of the recording apparatus 1. A tank supply valve V1 for switching the connection between the sub tank 151 and the main tank 141 is arranged in the middle of a tank connection flow path C1 connecting the sub tank 151 and the main tank 141.

In response to a detection of a small amount of the ink in the sub tank 151, the ink supply control unit 209 closes the atmosphere relief valve V0, a supply valve V2, a collection valve V4, and a head replacement valve V5. Further, the ink supply control unit 209 opens the tank supply valve V1. The ink supply control unit 209 operates the decompression pump P0 in this state, getting the pressure inside the sub tank 151 negative, causing the ink to be supplied from the main tank 141 to the sub tank 151. In response to a detection of an amount of the ink in the sub tank 151 exceeding a predetermined amount by the liquid level detection unit 151*a*, the ink supply control unit 209 closes the tank supply valve V1, stopping the decompression pump P0.

The supply flow path C2 is a flow path for supplying the ink from the sub tank 151 to the recording head 8, and a supply pump P1 and the supply valve V2 are arranged in the middle of The supply flow path C2. During recording operation, the supply pump P1 is driven with the supply valve V2 open, circulating the ink through the circulation path while supplying the ink to the recording head 8. The amount of ink to be discharged by the recording head 8 by unit time varies depending on the image data. The set flow rate of the supply pump P1 accommodates to the maximum consumed amount of the ink discharged by unit time by the recording head 8.

A relief flow path C3 upstream of the supply valve V2 connects the upstream side and the downstream side of the supply pump P1. A relief valve V3 as a differential pressure regulating valve is arranged in the middle of the relief flow path C3. The relief valve V3 is urged by a spring and is configured to open with a predetermined pressure, which is not opened or closed by a drive mechanism. For example, with an amount of ink supplied from the supply pump P1 by unit time greater than the total value of an amount of the ink discharged by the recording head 8 by unit time and a flow rate (an amount to take in the ink) at a collection pump P2 by unit time, the relief valve V3 is opened according to the pressure acting on the valve itself. This forms a circulation path of a part of the supply flow path C2 and the relief flow path C3. The configuration of the relief flow path C3 allows the amount of ink supplied to the recording head 8 to be adjusted according to the amount of the ink consumed by the recording head 8, providing a stable pressure in the circulation path regardless of the image data.

The collection flow path C4 is a flow path for collecting the ink from the recording head 8 to the sub tank 151, and the collection pump P2 and the collection valve V4 are arranged in the middle of the collection flow path C4. To circulate the ink in the circulation path, the collection pump P2 serves as the negative pressure generation source and sucks the ink from the recording head 8. The driving of the collection pump P2 produces an appropriate pressure difference between an IN flow path 80*b* and an OUT flow path 80*c* in the recording head 8, allowing the ink to be circulated from the IN flow path 80*b* to the OUT flow path 80*c*.

The collection valve V4 is also a valve for preventing backflow under the operations but recording operation, that is, with the ink uncirculated in the circulation path. In the circulation path according to the present exemplary embodiment, the sub tank 151 is above the recording head 8 in the vertical direction (refer to FIG. 1). This can cause the ink to flow from the sub tank 151 back to the recording head 8 due to the difference in hydraulic head between the sub tank 151 and the recording head 8 with the supply pump P1 and the collection pump P2 out of operation. To prevent the above-described backflow according to the present exemplary embodiment, the collection valve V4 is arranged on the collection flow path C4.

In addition, a backflow prevention valve V7 is arranged downstream of the collection valve V4 on the collection flow path C4. The backflow prevention valve V7 is a one-way valve that passes the ink from the upstream side to the downstream side of the flow path while blocking the ink flowing from the downstream side to the upstream side (backflow). As described above, the collection valve V4 (a drive valve) is controlled to be closed by the ink supply control unit 209 in response to a stop of the circulation to prevent the backflow. However, for example, if a power supply is turned OFF during the circulation, that can cause the backflow because the collection valve V4 remains not closed. Even if the collection valve V4 is not closed, the backflow prevention valve V7 as a one-way valve arranged on the collection flow path C4 prevents the backflow of the ink to the recording head 8. The backflow prevention valve V7 includes a spring and a sealing portion as an example. The sealing portion, which is urged by the spring, is opened with a predetermined difference in pressure between the upstream side and the downstream side of the backflow prevention valve V7, opening the flow path.

The supply valve V2 also serves as a valve for preventing supply of the ink from the sub tank 151 to the recording head 8 during the operations but recording operation, that is, with the ink uncirculated in the circulation path.

A head replacement flow path C5 is a flow path for connecting the supply flow path C2 and an air chamber (a space not containing the ink) of the sub tank 151, and the head replacement valve V5 is arranged in the middle of the head replacement flow path C5. One end of the head replacement flow path C5 is connected to the supply flow path C2 upstream of the recording head 8 and downstream of the supply valve V2. The other end of the head replacement flow path C5 is connected to the upper portion of the sub tank 151 communicating with the air chamber in the sub tank 151. The head replacement flow path C5 is used to take the ink out of the recording head 8 in use, for example, in replacement of the recording head 8 or a transport of the recording apparatus. The head replacement valve V5 is controlled by the ink supply control unit 209 so that the head replacement valve V5 is closed unless the recording head 8 is refilled with the ink, and unless the ink is collected from the recording head 8.

The cap unit 10 is connected to a flow path C6. A decompression pump P3 (an in-cap decompression pump) is arranged on the flow path C6. The ink supply control unit 209 drives the decompression pump P3 to produce a negative pressure in the cap unit 10. A maintenance cartridge CA is arranged downstream (opposite to the cap unit 10) of the decompression pump P3 on the flow path C6. The maintenance cartridge CA contains the ink discharged through the flow path C6.

Next, a flow path configuration in the recording head 8 will be described. The ink supplied from the supply flow path C2 to the recording head 8 passes through a filter 83 and then is supplied to a first negative pressure control unit 81 and a second negative pressure control unit 82. The control pressure of the first negative pressure control unit 81 is set to a weak negative pressure (a negative pressure having a small pressure difference from an atmospheric pressure). The control pressure of the second negative pressure control unit 82 is set to a strong negative pressure (a negative pressure having a large pressure difference from the atmospheric pressure). The pressure at the first negative pressure control unit 81 and the pressure at the second negative pressure control unit 82 are generated in appropriate ranges by the driving of the collection pump P2.

In an ink discharge portion 80, a plurality of recording element substrates 80*a* in which a plurality of discharge ports is arrayed is arranged, forming a long discharge port array. A common supply flow path 80*b* (the IN flow path) for guiding the ink supplied from the first negative pressure control unit 81 and a common collection flow path 80*c* (the OUT flow path) for guiding the ink supplied from the second negative pressure control unit 82 extend in the array direction of the recording element substrates 80*a*. Further, an individual supply flow path connected to the common supply flow path 80*b* and an individual collection flow path connected to the common collection flow path 80*c* are formed in each of the recording element substrates 80*a*. This configuration produces an ink flow that runs into the common supply flow path 80*b*, which has a relatively weak negative pressure, out to the common collection flow path 80*c*, which has a relatively strong negative pressure, in each of the recording element substrates 80*a*. A pressure chamber that communicates with each discharge port and to be filled with the ink is provided on the path of the individual supply flow path and the individual collection flow path, allowing the ink to run in the discharge port and the pressure chamber out of recording operation. Discharge operation performed on a recording element substrate 80*a* causes some of the ink moved from the common supply flow path 80*b* to the common collection flow path 80*c* to be consumed due to the discharged from the discharge port, and the ink that has not been discharged to move to the collection flow path C4 through the common collection flow path 80*c*.

Figure 6A:
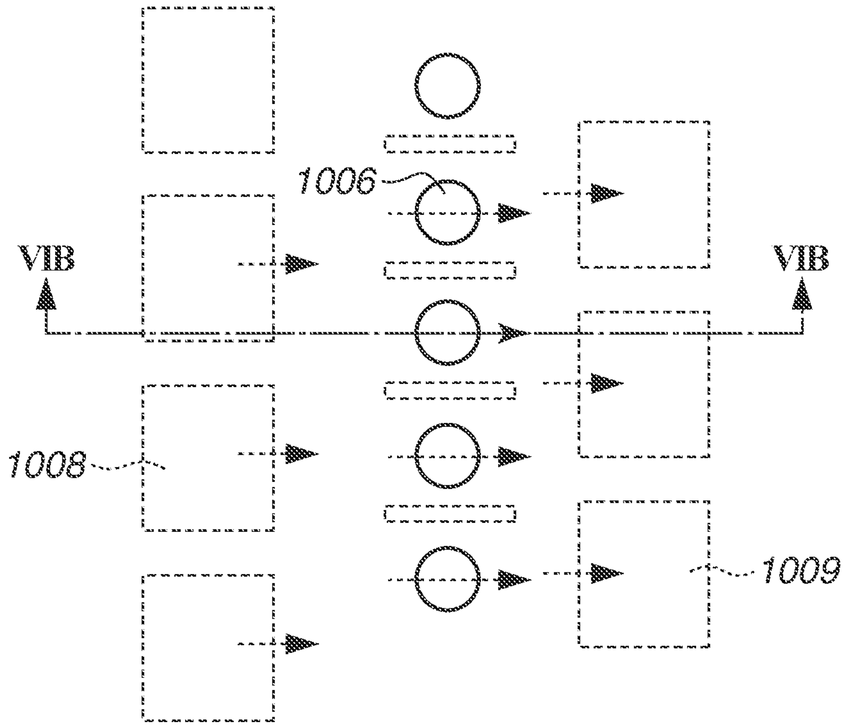
FIGS. 6A and 6B illustrate discharge ports and a pressure chamber.
Figure 6B:
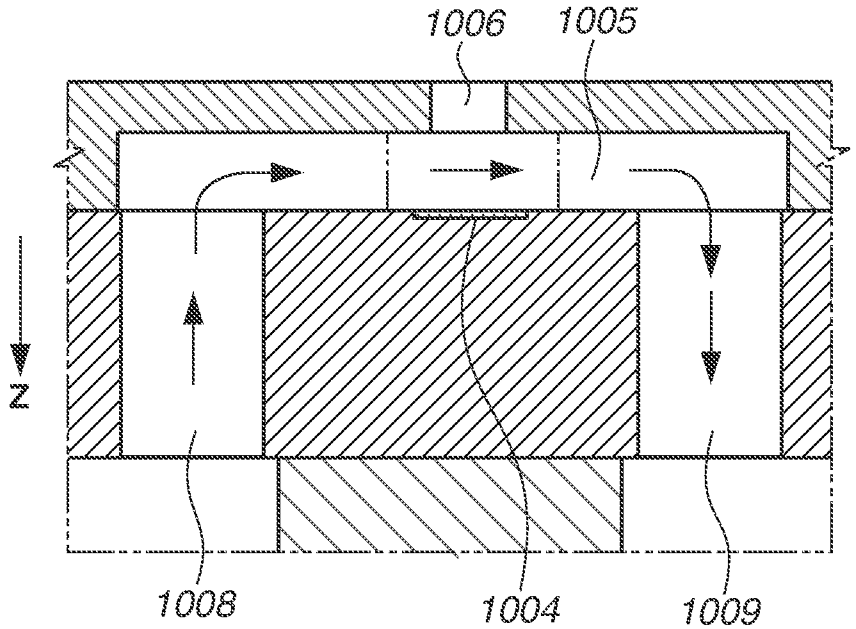

FIG. 6A is an enlarged planar schematic diagram of a part of the recording element substrates 80*a*, and FIG. 6B is a cross-sectional schematic view taken along a cross-sectional line VIB-VIB in FIG. 6A. Each recording element substrate 80*a* includes a pressure chamber 1005 to be filled with the ink and the discharge port 1006 for discharging the ink. A recording element 1004 is provided at a position facing the discharge port 1006 in the pressure chamber 1005. Further, each individual supply flow path 1008 connected to the corresponding common supply flow path 80*b* and each individual collection flow path 1009 connected to the corresponding common collection flow path 80*c* are formed for each discharge port 1006 in the recording element substrates 80*a*.

The above-described configuration produces the ink flow in a recording element substrate 80*a* that runs from the common supply flow path 80*b* having a relatively weak negative pressure (having a high absolute value of the pressure) out into the common collection flow path 80*c* having a relatively strong negative pressure (having a low absolute value of the pressure). More specifically, the ink runs into the common supply flow path 80*b*, the individual supply flow path 1008, the pressure chamber 1005, the individual collection flow path 1009, and the common collection flow path 80*c*, in this order. When the ink is discharged by the recording element 1004, some of the ink that moves from the common supply flow path 80*b* to the common collection flow path 80*c* is discharged out of the discharge port 1006 to the outside of the recording head 8. On the other hand, the ink that has not been discharged out of the discharge port 1006 is collected through the common collection flow path 80*c* to the collection flow path C4.

In recording operation with the above-described configuration, the ink supply control unit 209 closes the tank supply valve V1 and the head replacement valve V5, opens the atmosphere relief valve V0, the supply valve V2, and the collection valve V4, and drives the supply pump P1 and the collection pump P2, forming the circulation path of the sub tank 151, the supply flow path C2, the recording head 8, the collection flow path C4, and the sub tank 151, in this order of circulation. With an amount of the ink supplied from the supply pump P1 by unit time greater than the total value of an amount of the ink discharged from the recording head 8 by unit time and a flow rate at the collection pump P2 by unit time, the ink flows from the supply flow path C2 into the relief flow path C3. This allows the flow rate of the ink flowing from the supply flow path C2 into the recording head 8 to be adjusted.

Out of recording operation, the ink supply control unit 209 stops the supply pump P1 and the collection pump P2 and closes the atmosphere relief valve V0, the supply valve V2, and the collection valve V4. This stops the ink flow in the recording head 8, and prevents the backflow due to the difference in hydraulic head between the sub tank 151 and the recording head 8. Further, the closing of the atmosphere relief valve V0 prevents leakage and evaporation of the ink from the sub tank 151.

<Stirring and Deaerating of Ink>

Operations of stirring and deaerating the ink in the sub tank 151 as a liquid container will be described. The ink supplied in the sub tank 151 subsides over time. After a predetermined period has elapsed since a supply of the ink from the main tank 141 to the sub tank 151, the concentration of the ink in the sub tank 151 becomes high at the bottom and low at the liquid surface side. If the ink is supplied from the sub tank 151 to the recording head 8 in this state, the high concentration ink will be supplied to the recording head 8 because the supply flow path C2 is connected to the bottom of the sub tank 151. This will cause the color of an image on a recording medium S to be dark at the beginning of recording and to become lighter as the ink in the sub tank 151 is consumed. To solve this issue, the ink in the sub tank 151 is stirred by a stirring mechanism. This prevents the concentration difference in the sub tank 151 from affecting the color of images on recording media S.

In addition, oxygen is dissolved in the ink supplied to the sub tank 151 by the amount of saturated dissolved oxygen in the ink over time. Bubbles are generated in the flow path from the ink containing a predetermined amount of dissolved oxygen. If bubbles blocks the flow path, that makes it difficult for the ink to flow in. As a result, the ink cannot be discharged from the discharge port 1006 of the recording head 8. To solve this issue, deaeration operation is performed to remove dissolved oxygen from the ink in the sub tank 151. According to the present exemplary embodiment, an operation of performing stirring and deaeration simultaneously will be described.

Figure 7:
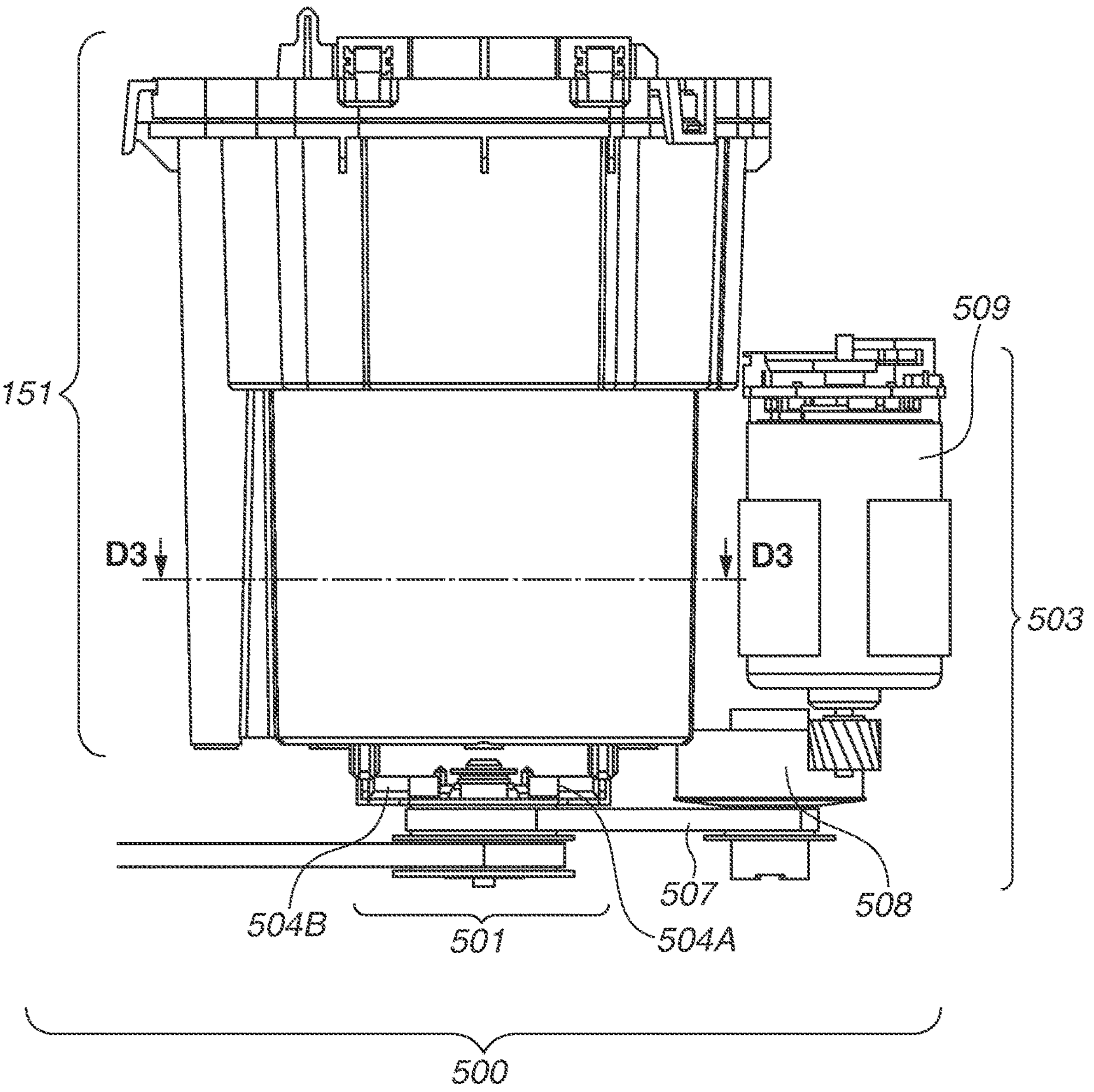
FIG. 7 is a side view of a stirring mechanism.
Figure 8:
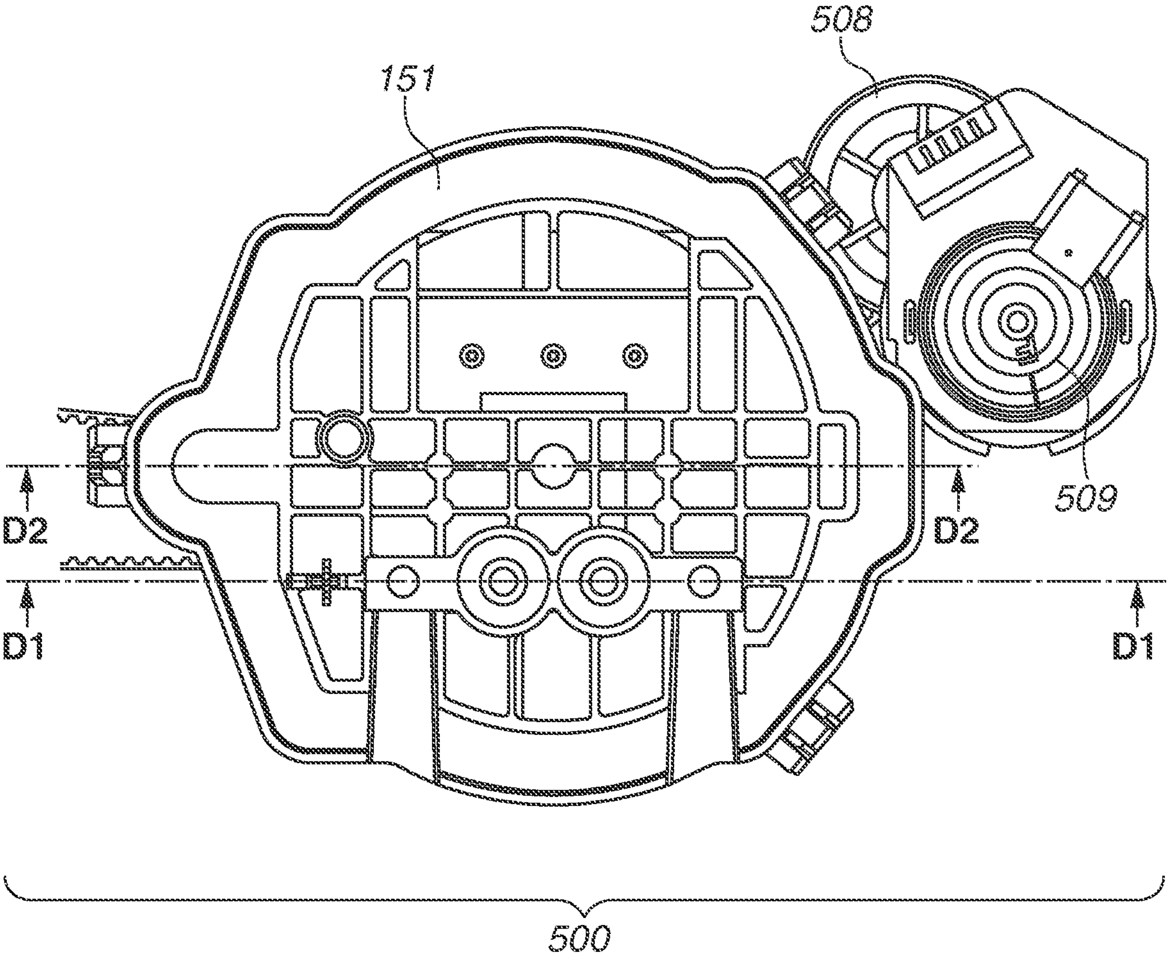
FIG. 8 is a top view of the stirring mechanism.
Figure 9:
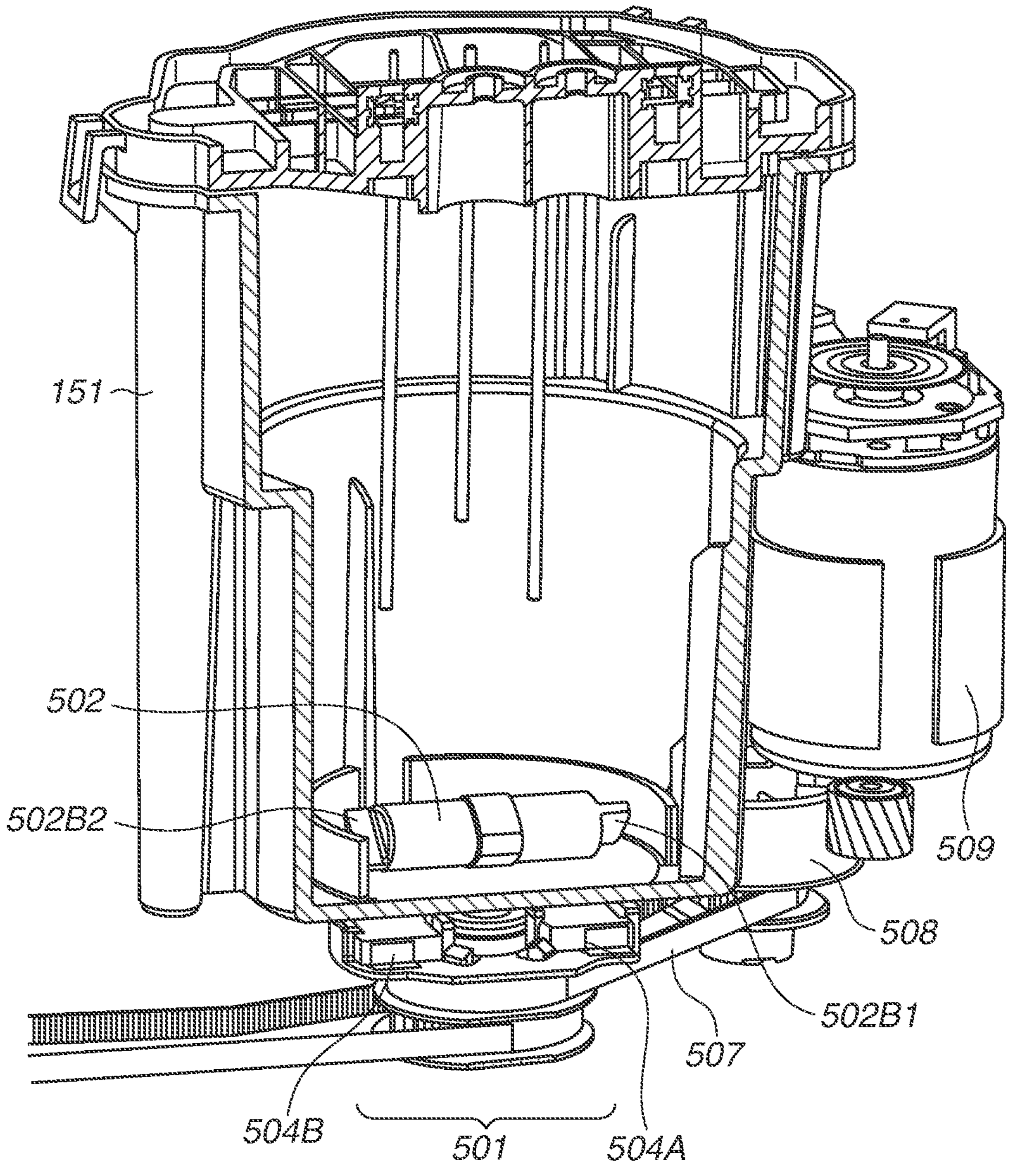
FIG. 9 is a perspective cross-sectional view illustrating the inside of a sub tank of the stirring mechanism.
Figure 10:
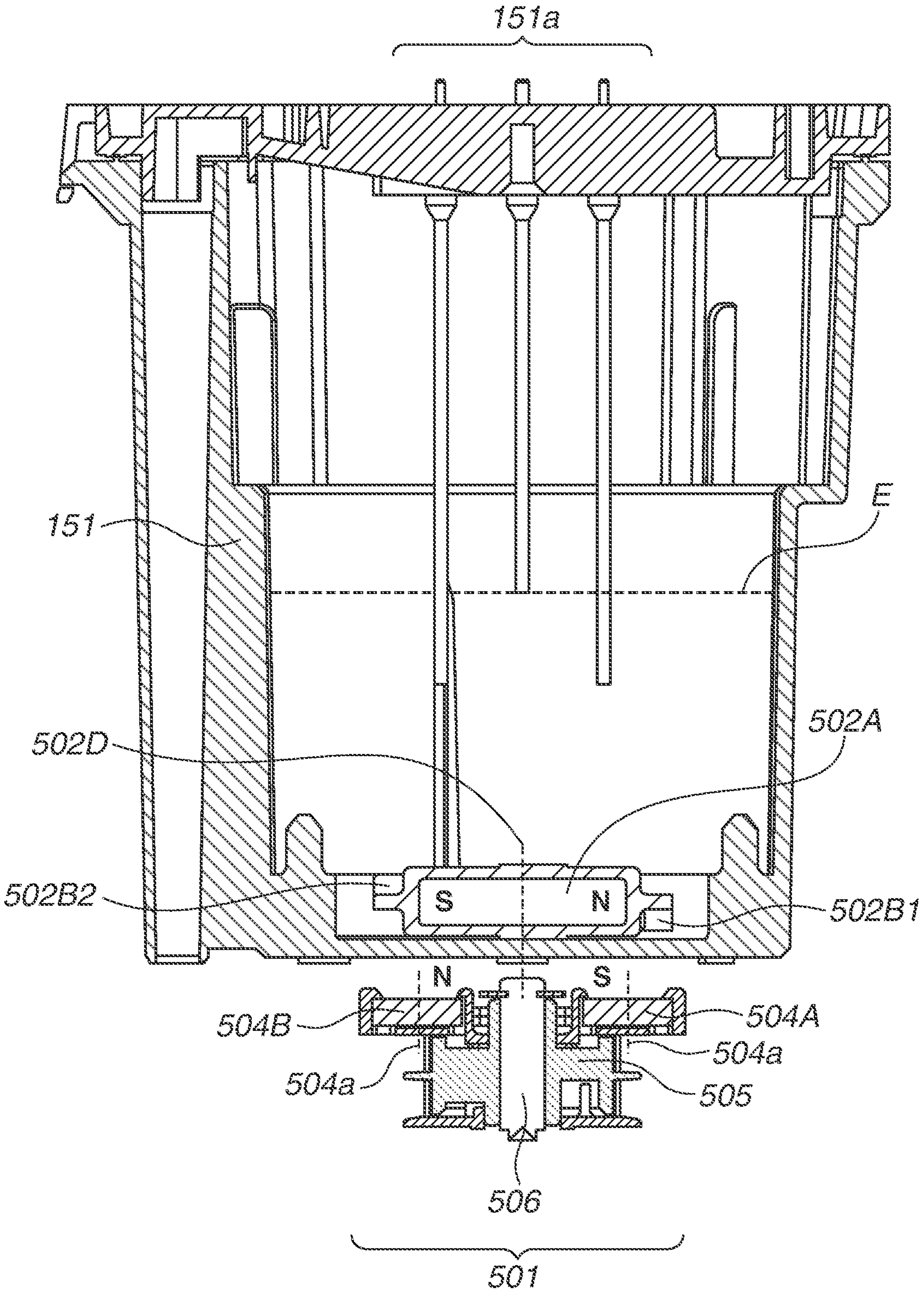
FIG. 10 is a side cross-sectional view of the stirring mechanism.

First, the stirring mechanism and a stirring operation will be described. FIGS. 7, 8, and 9 illustrate a stirring mechanism 500 for one color. FIG. 8 is a top view of the stirring mechanism 500, and FIG. 9 is a perspective cross-sectional view of the inside of the sub tank 151 taken along a cutting line D1 of FIG. 8. The stirring mechanism 500 includes the sub tank 151, a stirrer 501 placed with a gap under the bottom of the sub tank 151, a stirring element 502 placed on the bottom of the sub tank 151, and a stirring drive mechanism 503 to rotate the stirrer 501. The stirring element 502 is placed on the bottom of the sub tank 151 as illustrated in FIG. 9. This configuration has no positioning elements such as a component to axially support the stirring element 502 from the sub tank 151. FIG. 10 is a cross-sectional view of the stirring mechanism 500 taken along a cutting line D2 of FIG. 8. The stirring element 502 includes a stirring element magnet 502A inside a cylindrical rod-shaped body. Plastic resin covers the stirring element magnet 502A and forms the outer shape. The rod-shaped body may form a polygonal prism instead of a cylindrical shape and may form a column of which the cross sectional area becomes larger from its end portions to its center in the longitudinal direction.

The stirrer 501 includes a pulley 505 as a rotating body including two stirrer magnets 504A and 504B (also referred to as stirrer magnets 504). The pulley 505 is rotatably supported by and rotates on a pulley shaft 506 as a rotating shaft. The pulley 505 is linked to a stirring belt 507, which is linked to a stirring gear 508. Further, the stirring gear 508 is linked to a stirring motor 509. In other words, the stirring motor 509 in operation rotates the pulley 505 and rotates the stirrer magnets 504 attached to the pulley 505 on the rotating shaft. The stirrer magnet 504B has an N pole at its upper side (nearer to the sub tank 151) facing the bottom of the sub tank 151, and the stirrer magnet 504A has an S pole at its upper side. The stirring element magnet 502A has an N pole on one end portion and an S pole on the other end portion in the longitudinal direction of the rod-shaped body. With the pulley 505 at a standstill, the S pole of the stirring element 502 is attracted to the N pole of the stirrer magnet 504B, and the N pole of the stirring element 502 is attracted to the S pole of the stirrer magnet 504A, making the position and orientation of the stirring element 502 stable. As the stirring motor 509 is operated at this state, the pulley 505 as the rotating body rotates, and the stirring element 502 also rotates following the stirrer magnets 504. The rotating stirring element 502 produces a flow for rotating the ink in the sub tank 151. This stirs the ink to mix the high-concentration ink settled on the bottom of the sub tank 151 and the low-concentration ink near and at the liquid surface.

Figure 16:
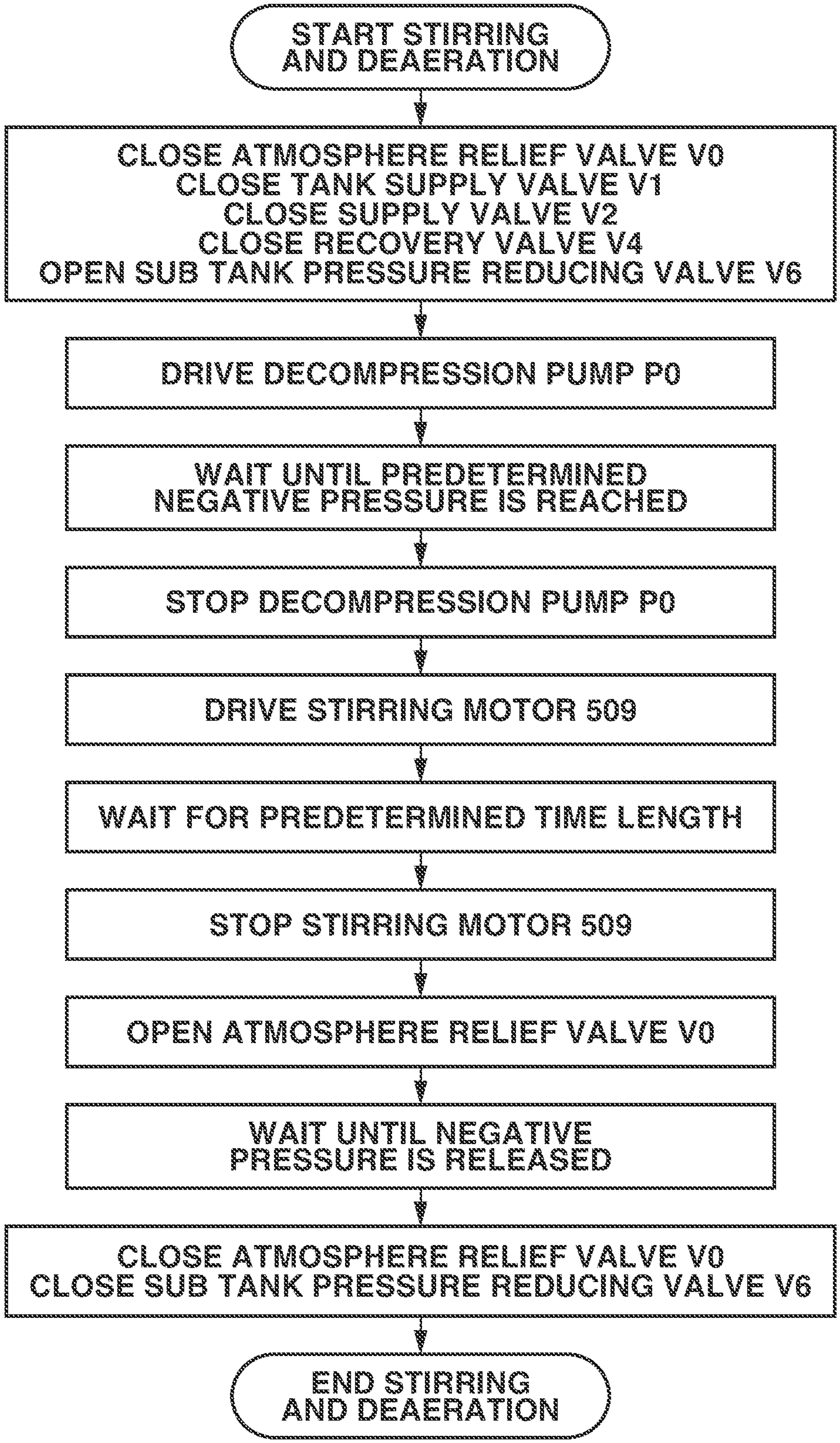
FIG. 16 is a flowchart illustrating a stirring and deaeration operation.

Next, a deaeration operation will be described. The deaeration operation is performed by decompressing the inside of the sub tank 151 in addition to the above-described stirring operation. The deaeration operation applied to the ink supply unit 15 will be described with reference to a flowchart in FIG. 16. First, the atmosphere relief valve V0, the tank supply valve V1, the supply valve V2, and the collection valve V4 are closed, and the sub tank pressure reducing valve V6 is opened. Next, the decompression pump P0 is operated, making the pressure inside the sub tank 151 negative. After the pressure inside the sub tank 151 reaches a predetermined negative pressure, the decompression pump P0 is stopped. The negative pressure of the gas in the sub tank 151 reduces the amount of oxygen dissolved in the ink to deaerate the ink. To further increase deaeration efficiency, the above-described stirring operation is performed with the negative pressure inside the sub tank 151. The stirring motor 509 starts to be operated, and after a predetermined period, the stirring motor 509 is stopped. The predetermined period is a time length spent on stirring and deaerating the ink. A principle of deaeration by the above-described operation is as follows. The rotation of the stirring element 502 by the operation of the stirring motor 509 produces bubbles in the ink by cavitation. Bubbles produced by cavitation will dissolve in the ink again while the ink settles down after the stirring operation is stopped. On the other hand, the phenomenon of bubbles rising to a liquid surface E (FIG. 10) and disappearing before dissolving in the ink means that the bubbles are separated from the ink, deaerating the ink in the sub tank 151. If the deaeration operation is completed, the atmosphere relief valve V0 is opened for a predetermined period until the negative pressure in the sub tank 151 is released. If the negative pressure is released, the atmosphere relief valve V0 and the sub tank pressure reducing valve V6 are closed, completing the operation. The deaeration operation is performed at the time set to the main body and is typically performed once a day. An operator sets the time to perform the deaeration operation with buttons on the operation panel 104.

A specific shape of the stirring element 502 will be described. The stirring element 502 includes the stirring element magnet 502A inside the plastic resin. Both end portions of the stirring element magnet 502A in the longitudinal direction are located at the centers of the stirrer magnets 504 (FIG. 10). In other words, the end portion on a blade 502B1 is the N pole and is located at the center of the stirrer magnet 504 A, which is the S pole. The end portion on a blade 502B2 is the S pole and is located at the center of the stirrer magnet 504B, which is the N pole. The positions of both end portions may be positions with strong magnet force at both end portions. If the end portions of the stirring element magnet 502A are located at positions off the centers 504*a* of the stirrer magnets 504, one of the end portions of the stirring element magnet 502A is attracted to a portion of a strong magnetic force of the stirrer magnet 504 nearer the one of the end portions of the stirring element magnet 502A (here, the center 504*a* of the stirrer magnet 504). This makes the center of the stirring element 502 off the center position of the pulley 505. Then, the stirring element 502 cannot rotate about a rotating axis 502D at the center in the longitudinal direction in rotating. This makes it difficult for the stirring element 502 to rotate following the stirrer magnets 504, making the stirring element 502 out of synchronization. In other words, the end portions of the stirring element magnet 502A are aligned with the centers 504*a* of the stirrer magnets 504, preventing the stirring element 502 from coming out of synchronization during stirring. This configuration allows the rotation speed of the stirrer 501 to be increased, producing an effect of shortening an operation period of the stirring and deaeration of the liquid. The stirring element magnet 502A may be divided into two and each arranged at either end portion in the longitudinal direction instead of the integral one.

On the both end portions of the stirring element 502 are plate-shaped blades 502B (also referred to as blades 502B1 and 502B2) each having a flat surface extending in the longitudinal direction.

Figure 11:
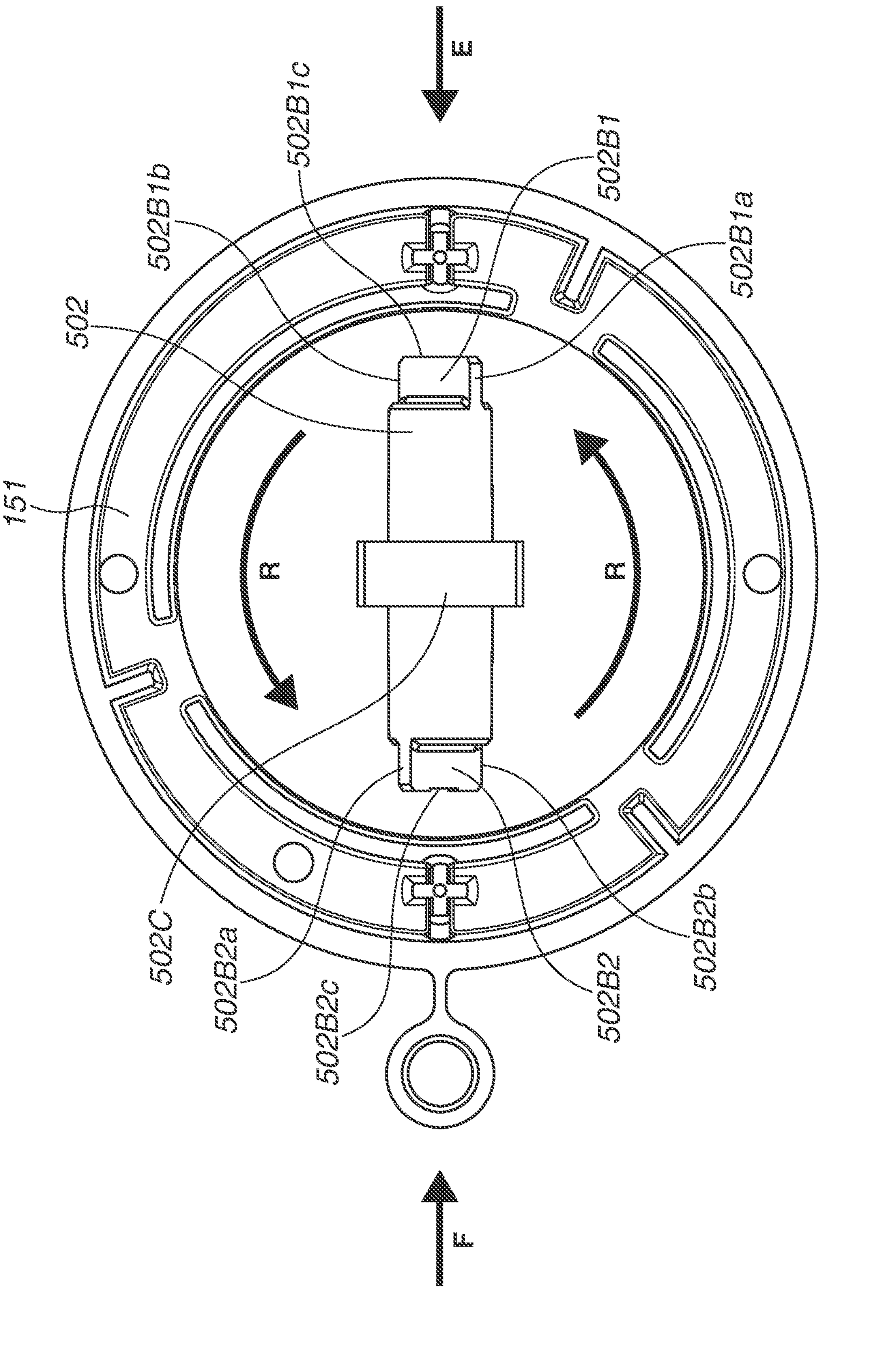
FIG. 11 is a top cross-sectional view of the stirring mechanism.
Figure 12:
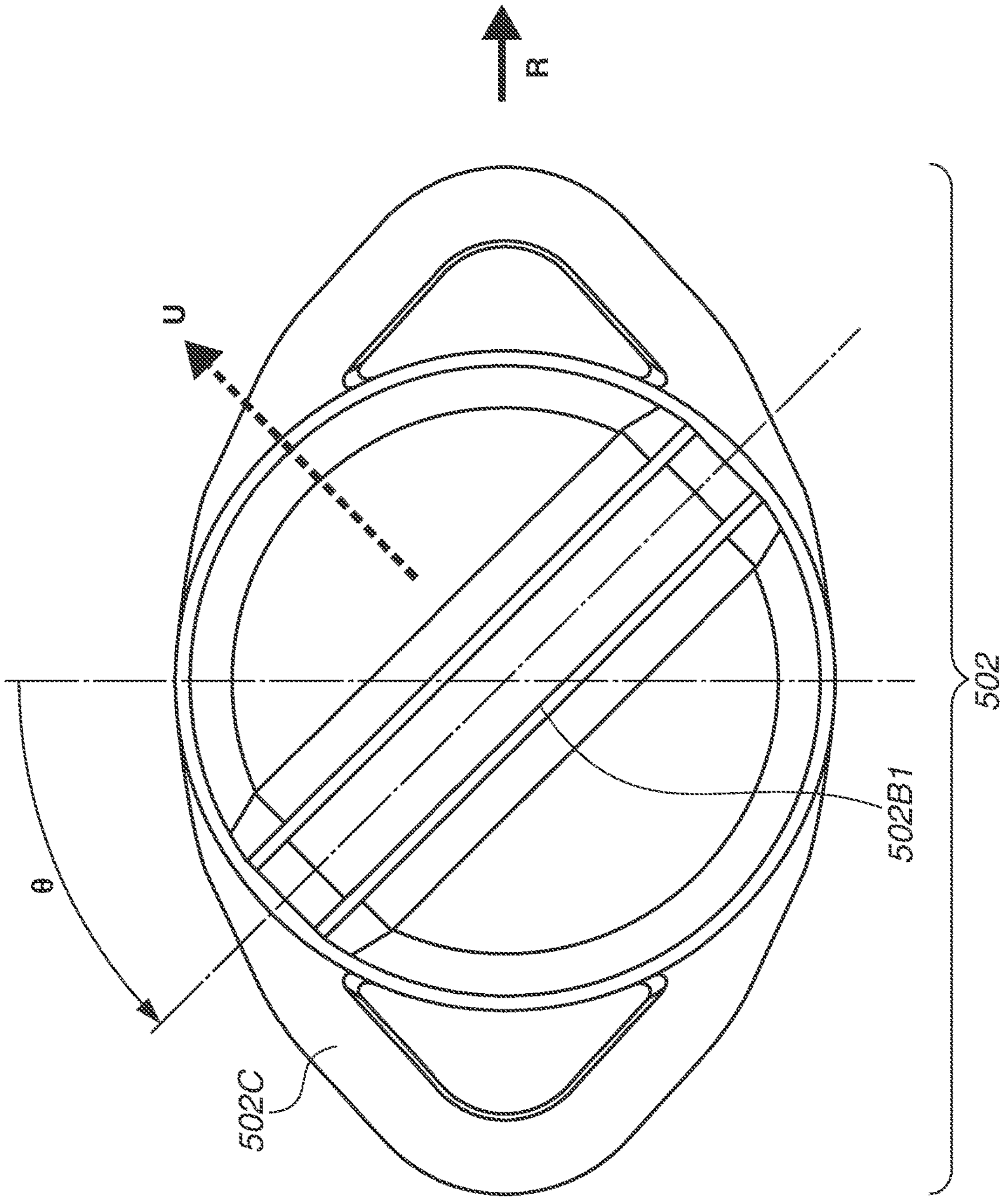
FIG. 12 is a side view of one end portion of a stirring element viewed in an E direction in FIG. 11.
Figure 13:
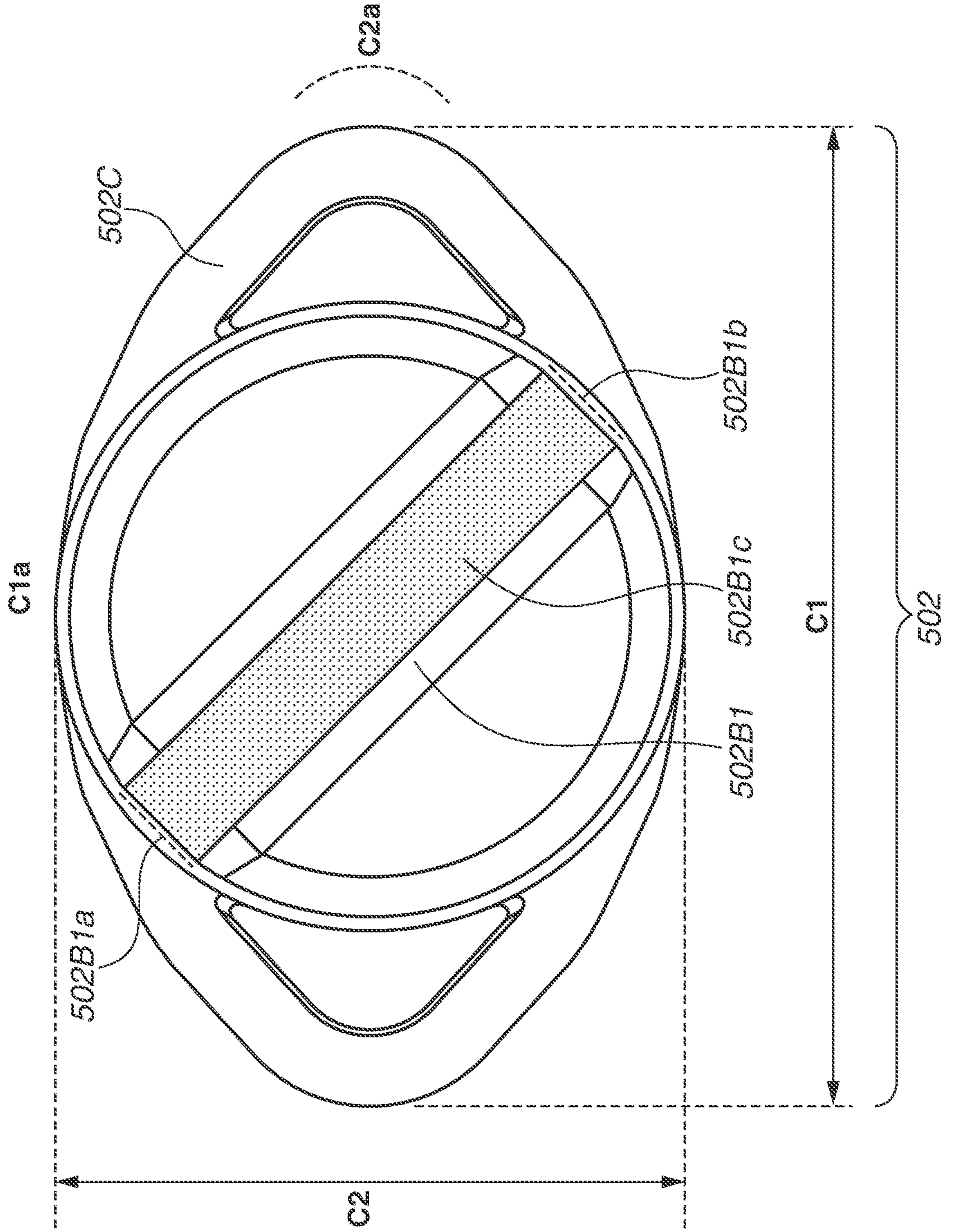
FIG. 13 is a side view of the end portion of the stirring element viewed from the E direction in FIG. 11.
Figure 17:
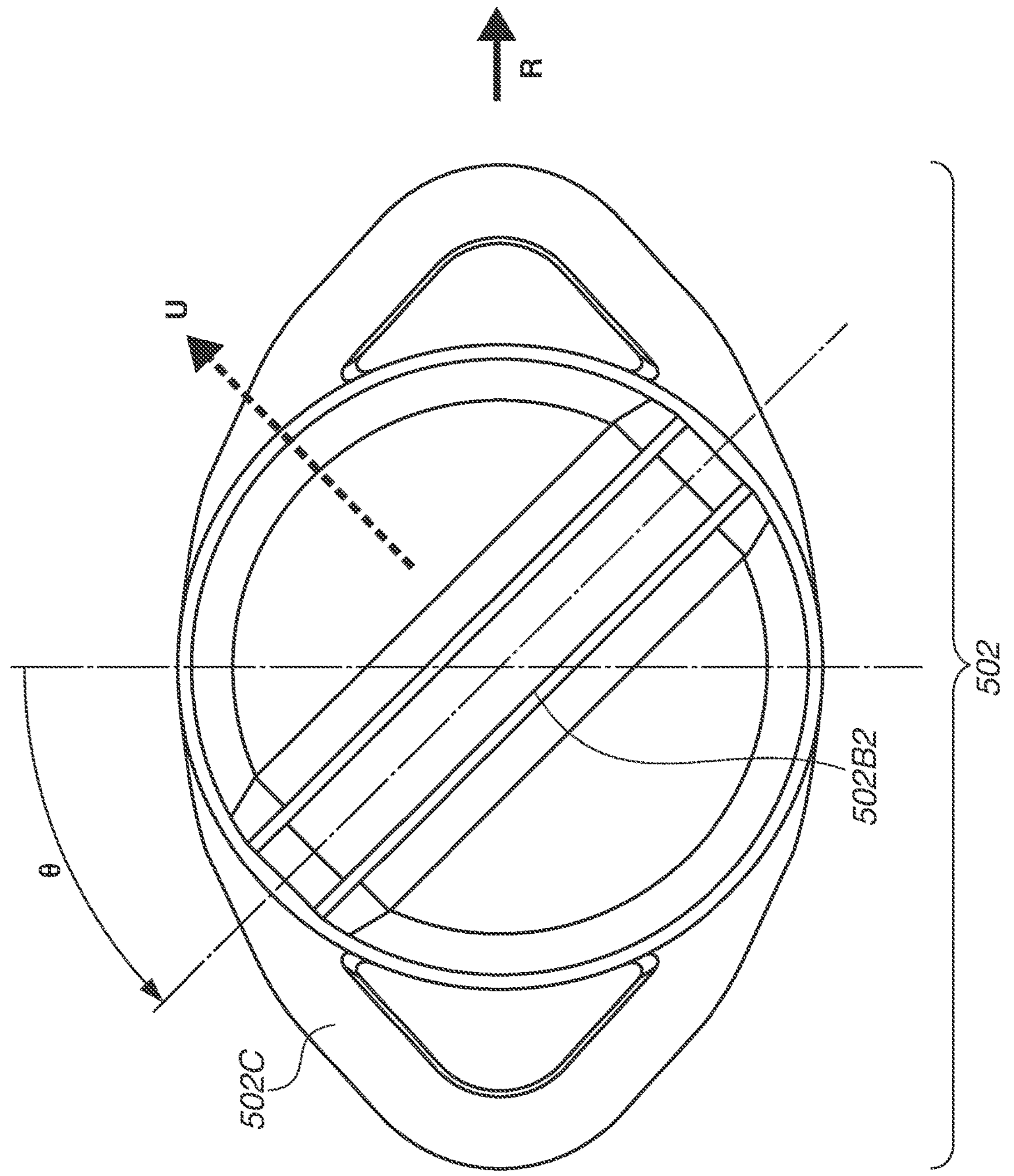
FIG. 17 is a side view of the end portion of the stirring element viewed in an F direction in FIG. 11.
Figure 18:
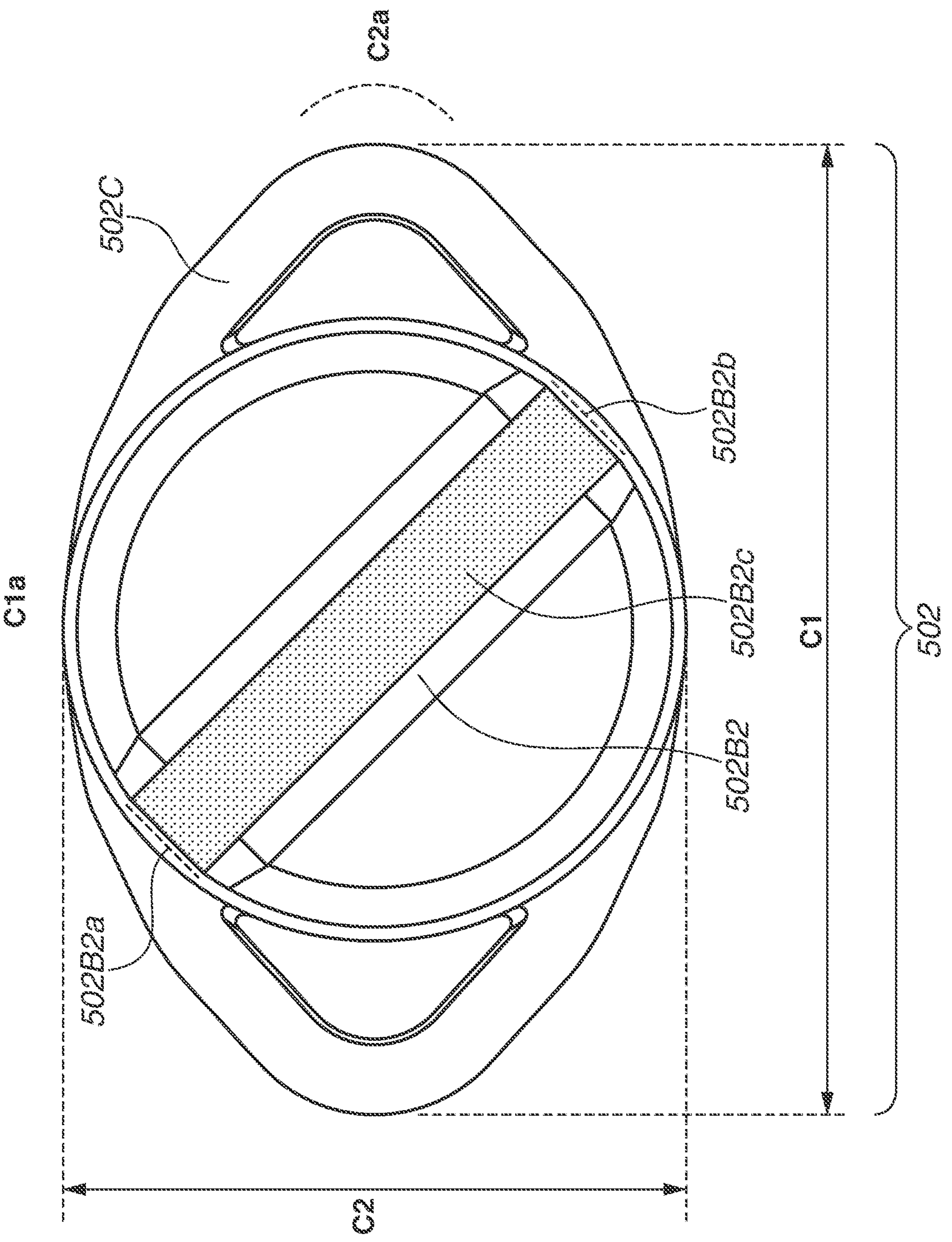
FIG. 18 is a side view of the end portion of the stirring element viewed in the F direction in FIG. 11.

Plate-shaped blades each having a curved surface may be provided on both end portions of the stirring element 502. FIG. 11 illustrates the inside of the sub tank 151 taken along a cutting line D3 in FIG. 7, and the stirring element 502 in the stirring operation is rotated in an R direction indicated by the arrows as the circumferential direction of the rotating shaft of the pulley. FIG. 12 illustrates the side surface of one end portion of the stirring element 502 viewed in an arrow E direction in FIG. 11. The blade 502B is wholly within the cross sectional area of the rod-shaped body on the plane orthogonal to the longitudinal direction of the rod-shaped body. The blade 502B inside the area of the cross section does not hinder the rotation of the stirring element 502. The blades 502B on both end portions of the stirring element 502 rotate in the R direction on the right in FIG. 12, and the stirring element 502 rotates about the center of the rod-shaped body in the longitudinal direction as a fulcrum. The blade 502B is inclined by an angle θ counterclockwise with respect to the vertical direction on the plane orthogonal to the longitudinal direction (FIGS. 12 and 17). In other words, the blade 502B1 has a side 502B1*b* near the bottom at the front end portion in the rotation direction and a side 502B1*a* far from the bottom at the rear end portion in the rotation direction as illustrated in FIG. 13. Similarly, the blade 502B2 has a side 502B2*b* near the bottom on the front end portion in the rotation direction and a side 502B2*a* far from the bottom on the rear end portion in the rotation direction (FIG. 18). Further, the blade 502B2 at one end portion and the blade 502B1 at the other end portion are line symmetrical about the axis in the vertical direction in FIG. 12. The stirring element 502 has the axis of symmetry, which allows stable rotation of the stirring element 502. The blade 502B1 and the blade 502B2 may be symmetrical with respect to a point on the axis in the longitudinal direction.

The rotation of the stirring element 502 in the R direction produces a force to stir the ink in the sub tank 151. At that time, the side 502B2*b* as the front end portion of the blade 502B inclined by the angle θ leads to rotate, allowing the ink to be stirred in a U direction illustrated in FIG. 12. In other words, this configuration produces a flow of the ink from the bottom of the sub tank 151 toward the liquid surface, offering a higher stirring efficiency of the ink, with bubbles generated by the blade 502B sent to the liquid surface E to disappear. Thus, the deaeration efficiency is improved.

Figure 14:
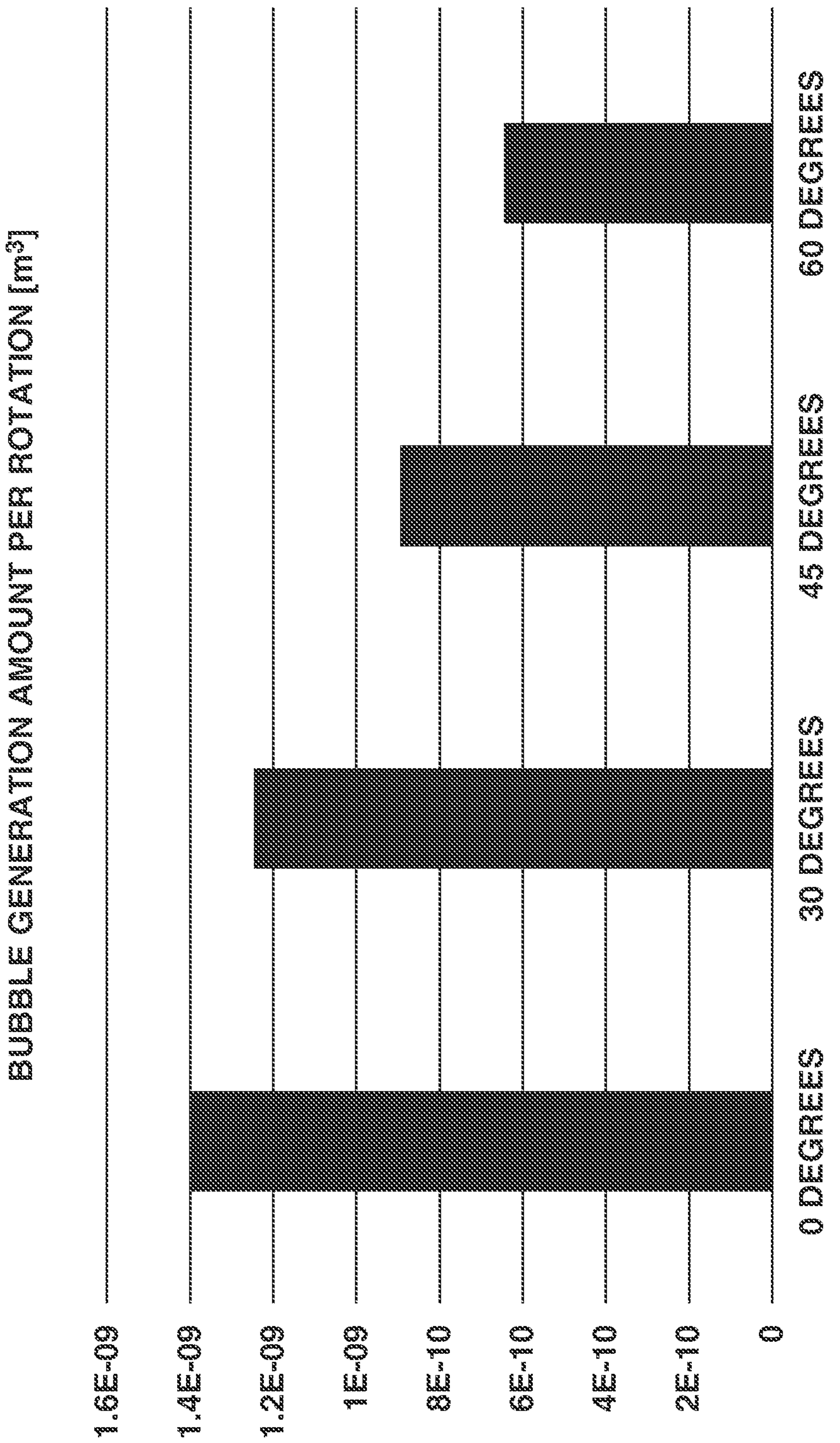
FIG. 14 is a graph illustrating an amount of bubbles generated per rotation of the stirring element.
Figure 15:
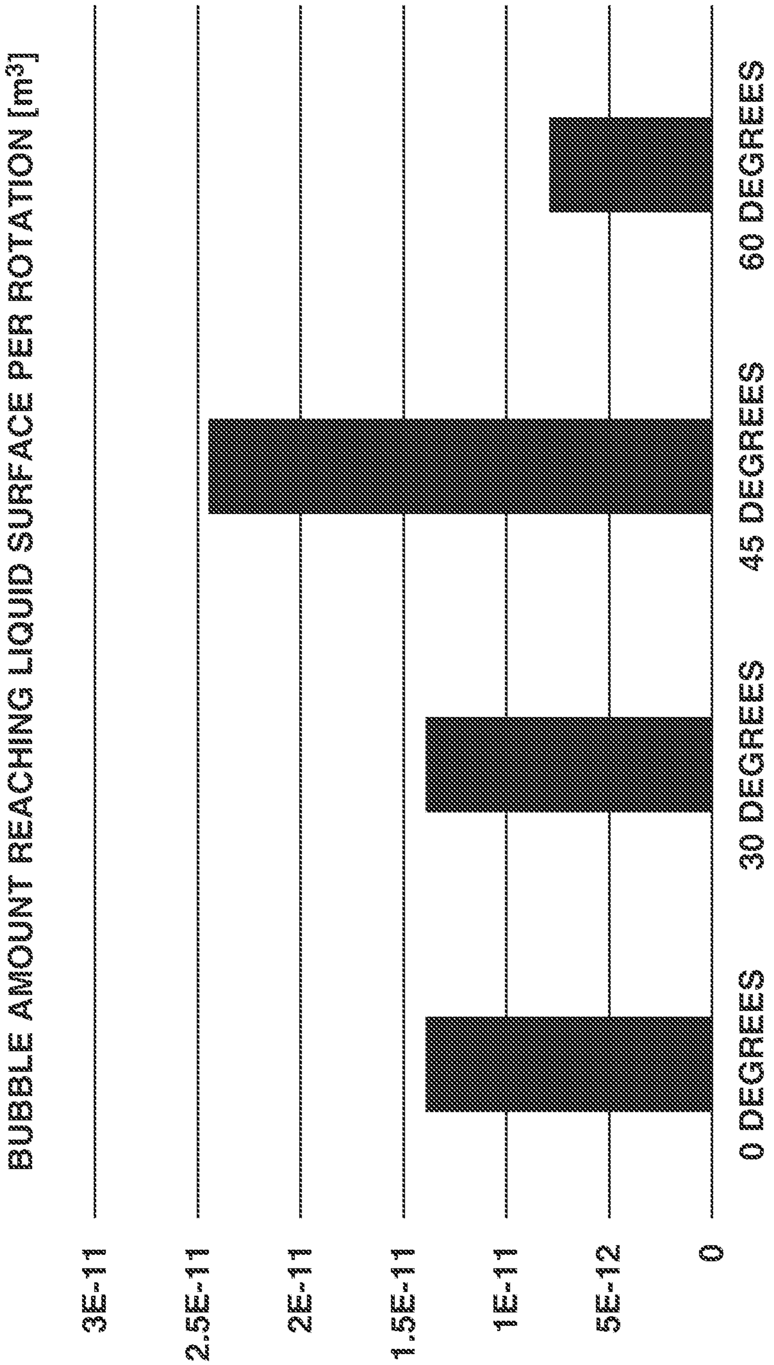
FIG. 15 is a graph illustrating an amount of bubbles reaching a liquid surface per rotation of the stirring element.

As the result of comparison in the angle θ of the blade 502B between 0 degrees, 30 degrees, 45 degrees, and 60 degrees, the angle with the best deaeration efficiency is 45 degrees as illustrated in FIG. 12. The deaeration efficiency depends on the amount of bubbles generated by cavitation and the ink flow that sends bubbles to the liquid surface E. The amount of bubbles generated increases in the order of 0 degrees>30 degrees>45 degrees>60 degrees. This is because more cavitation occurs as the cross sectional area of the blade 502B is greater to the rotation direction. In other words, as the angle θ becomes larger, the cross sectional area of the blade 502B becomes smaller, and less cavitation occurs. FIG. 14 illustrates data about amounts of bubbles generated by cavitation per rotation of the stirring element 502 based on simulation. On the other hand, the ease of sending bubbles to the liquid surface E is in the order of 60 degrees>45 degrees>30 degrees>0 degrees because the U direction illustrated in FIG. 12 is closer to the perpendicular direction as the angle θ is larger. FIG. 15 illustrates amounts of bubbles sent to the liquid surface E per rotation of the stirring element 502 as simulation results. The amount of bubbles sent to the liquid surface E is lager in the order of 45 degrees>0 degrees 30 degrees>60 degrees. Thus, the angle indicating the best deaeration efficiency is 45 degrees. The 45 degree configuration has a tolerance of several degrees as manufacturing errors. Further, the optimum angle varies depending on the rotation speed of the stirring element 502, the sizes of the sub tank 151 and the stirring element 502, the height of the liquid surface E of the ink, for example.

The stirring element 502 is not positioned with respect to the sub tank 151, and is just placed inside thereof. If the stirring element 502 forms a cylinder, stirring element 502 rotates in the circumferential direction, with the angle of the blade 502B unstable.

On the other hand, if the stirring element 502 forms a prism, its orientation and position may be stable with one plane as the bottom surface, which may make the angle of the blade 502B off a predetermined angle. Thus, the stirring element 502 includes a rotation preventing portion 502C for preventing rotation in the circumferential direction at the center in the longitudinal direction. The shape of the rotation preventing portion 502C has a long side C1 (approximately 13 mm) in the horizontal direction and a short side C2 (approximately 8 mm) in the perpendicular direction on the plane orthogonal to the longitudinal direction, and an outer circumference surface C1*a* on the long side curves (FIG. 13). The outer circumference surface C1*a* has a curvature as large as possible. This is because, with the center of the stirring element 502 out of alignment with the center of the plastic resin covering the outside, the stirring element 502 will rotate in the circumferential direction by the amount of deviation of the center of gravity from the center, and the orientation and position is stabilized in that state. Reduction in the amount of rotation of the stirring element in the circumference direction allows the angle θ to be held at a value close to a predetermined angle. On the other hand, a greater curvature results in a longer length of the long side C1 and a larger size of the stirring element 502. These lengths are set appropriately in consideration of the size of the sub tank 151 as an example. In addition, a front end portion C2*a* of the long side C1 also curves to prevent the front end portion C2*a* from becoming the bottom surface. The rotation preventing portion 502C provided at the center of the stirring element 502 as described above allows the angle θ of the blade 502B to be substantially held at a predetermined angle even without positioning the stirring element 502 with respect to the sub tank 151. According to the present exemplary embodiment, the length of the stirring element magnet 502A is approximately 20 mm, the height of the stirrer magnet 504 is approximately 3 mm in the vertical direction and the cross-sectional surface is approximately 10 mm by approximately 10 mm, and the sub tank 151 has an inner diameter of approximately φ50 mm.

A stirring operation speed and a stirring and deaeration operation period will be described. According to the conventional configuration, the rotation speed of the stirrer 501 is approximately 800 rpm, and a higher rotation speed than that can make the stirring element 502 out of synchronization. In contrast, the configuration of aligning both end portions of the stirring element magnet 502A with the centers 504*a* according to the present exemplary embodiment allows the operation of the stirring element 502 at a stirring rotation speed of approximately 1000 rpm. Further, the period of stirring and deaeration operation is approximately 320 seconds from the start to the completion of the processing in the flowchart of FIG. 16 according to the conventional configuration. The stirring element 502 provided with the blades 502B and the rotation preventing portion 502C shortens the period down to approximately 220 seconds. Further, if the rotation speed of the above-described stirrer 501 is set to approximately 1000 rpm, the operation period can be shortened down to approximately 150 seconds.

As described above, the stirring element 502 provided with the blades on both end portions of the rod-shaped body in the longitudinal direction offers a higher stirring efficiency of liquid with a simple configuration. Further, a stirring device and a recording apparatus with the stirring element 502 according to the present exemplary embodiment in the sub tank 151 provides a higher stirring efficiency and deaeration efficiency of ink.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2020-181044, filed Oct. 29, 2020, which is hereby incorporated by reference herein in its entirety.

What is claimed is:

1. A stirring element to stir liquid, the stirring element comprising:

a rod-shaped body configured to form a cylindrical shape and configured to have a magnetic force at a first end portion and to have a magnet force at a second end portion opposite to the first end portion in a longitudinal axis;

a first blade configured to extend the first end portion of the rod-shaped body; and a second blade configured to extend the second end portion of the rod-shaped body, wherein the first blade and the second blade each have a plate shape and, on an orthogonal plane orthogonal to the longitudinal axis, the plate shape has a cross sectional area less than the cross sectional area of the first end portion or the second end portion, and wherein the rod-shaped body includes a preventing portion configured to prevent rotation in a circumferential direction of the rod-shaped body about the longitudinal axis of the rod-shaped body, and in the orthogonal plane, the preventing portion extends to both sides of the longitudinal axis with a length greater than a radius of the rod-shaped body.

2. The stirring element according to claim 1, wherein the first blade and the second blade have an axis of symmetry on the orthogonal plane.

3. The stirring element according to claim 1, wherein the first blade and the second blade are within a cross sectional area of the rod-shaped body on the orthogonal plane.

4. The stirring element according to claim 1, wherein the length in a first direction on the orthogonal plane is longer than the length in a second direction orthogonal to the first direction on the orthogonal plane.

5. The stirring element according to claim 1, wherein the plate shape of the first blade and the second blade each include a flat surface extending in a plane parallel to the longitudinal axis and intersecting a plane parallel to a surface of the liquid at an oblique angle.

6. A stirring device comprising:

a rod-shaped body configured to form a cylindrical shape and configured to have a magnetic force at a first end portion and to have a magnet force at a second end portion opposite to the first end portion in a longitudinal axis;

a liquid container configured to include the rod-shaped body placed therein and to contain liquid; and a rotating body configured to face a bottom of the liquid container from below, to rotate on a rotation shaft, and to include magnets at a plurality of positions, wherein a first blade and a second blade extend from each of the first end portion and the second end portion of the rod-shaped body in the longitudinal axis, respectively, wherein the first blade and the second blade each have a plate shape and, on an orthogonal plane orthogonal to the longitudinal axis, the plate shape has a cross sectional area less than the cross sectional area of the first end portion or the second end portion, and wherein the rod-shaped body includes a preventing portion configured to prevent rotation in a circumferential direction of the rod-shaped body about the longitudinal axis of the rod-shaped body, and in the orthogonal plane, the preventing portion extends to both sides of the longitudinal axis with a length greater than a radius of the rod-shaped body.

7. The stirring device according to claim 6, wherein, in rotation of the first blade and the second blade in a circumference direction of the rotating shaft of the rod-shaped body, front end portions of the first blade and the second blade are closer to the bottom of the liquid container than rear end portions of the first blade and the second blade.

8. The stirring device according to claim 6, wherein the first blade and the second blade are inside a cross section of the rod-shaped body on the orthogonal plane.

9. The stirring device according to claim 6, wherein the length in a first direction on the orthogonal plane is longer than the length in a second direction orthogonal to the first direction on the orthogonal plane.

10. The stirring device according to claim 6, wherein a smaller angle between the first blade or the second blade and the rotating shaft is 45 degrees.

11. The stirring device according to claim 6, wherein the magnets include a first magnet of which an N pole faces the bottom and a second magnet of which an S pole faces the bottom, the first end portion is located at a center of the first magnet, and the second end portion is located at a center of the second magnet.

12. The stirring device according to claim 6, wherein the plate shape of the first blade and the second blade each include a flat surface extending in a plane parallel to the longitudinal axis and intersecting a plane parallel to a surface of the liquid at an oblique angle.

13. An inkjet recording apparatus comprising:

a recording head configured to discharge ink to record an image on a recording medium;

a rod-shaped body configured to form a cylindrical shape and configured to have a magnetic force at a first end portion and to have a magnet force at a second end portion opposite to the first end portion in a longitudinal axis;

a liquid container configured to include the rod-shaped body placed therein and to contain ink;

a flow path configured to connect the recording head and the liquid container; and a rotating body configured to face a bottom of the liquid container from below, to rotate on a rotation shaft, and to include magnets at a plurality of positions, wherein the first end portion and the second end portion of the rod-shaped body include a first blade and a second blade extending in the longitudinal axis, respectively, and wherein the first blade and the second blade each have a plate shape and, on an orthogonal plane orthogonal to the longitudinal axis, the plate shape has a cross sectional area less than the cross sectional area of the first end portion or the second end portion, and wherein the rod-shaped body includes a preventing portion configured to prevent rotation in a circumferential direction of the rod-shaped body about the longitudinal axis of the rod-shaped body, and in the orthogonal plane, the preventing portion extends to both sides of the longitudinal axis with a length greater than a radius of the rod-shaped body.

14. The inkjet recording apparatus according to claim 13, wherein the first blade and the second blade are inside a cross section of the rod-shaped body on the orthogonal plane.

15. The inkjet recording apparatus according to claim 13, wherein the length in a first direction on the orthogonal plane is longer than the length in a second direction orthogonal to the first direction on the orthogonal plane.

16. The inkjet recording apparatus according to claim 13, wherein the liquid container is provided with a pump to perform decompression to deaerate ink.

17. The inkjet recording apparatus according to claim 13, wherein the rotating body is rotated after the liquid container is decompressed.

18. The inkjet recording apparatus according to claim 13, wherein the plate shape of the first blade and the second blade each include a flat surface extending in a plane parallel to the longitudinal axis and intersecting a plane parallel to a surface of the liquid at an oblique angle.

* * * * *